US010034124B2

(12) United States Patent
Son et al.

(10) Patent No.: US 10,034,124 B2
(45) Date of Patent: Jul. 24, 2018

(54) ELECTRONIC APPARATUS AND METHOD FOR IDENTIFYING AT LEAST ONE PAIRING SUBJECT IN ELECTRONIC APPARATUS

(71) Applicant: Samsung Electronics Co., Ltd., Suwon-si, Gyeonggi-do (KR)

(72) Inventors: Kwang-Sub Son, Suwon-si (KR); Won-Suk Choi, Seoul (KR); Sung-Ho Son, Daegu (KR); Young-Eun Han, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 123 days.

(21) Appl. No.: 15/130,378

(22) Filed: Apr. 15, 2016

(65) Prior Publication Data
US 2016/0309286 A1 Oct. 20, 2016

(30) Foreign Application Priority Data
Apr. 17, 2015 (KR) .................. 10-2015-0054708

(51) Int. Cl.
| H04W 4/00 | (2018.01) |
| H04W 12/06 | (2009.01) |
| H04W 40/24 | (2009.01) |
| H04L 29/06 | (2006.01) |
| H04W 4/80 | (2018.01) |
| H04W 84/18 | (2009.01) |
| H04W 8/00 | (2009.01) |

(52) U.S. Cl.
CPC ......... *H04W 4/008* (2013.01); *H04L 63/0861* (2013.01); *H04W 4/80* (2018.02); *H04W 12/06* (2013.01); *H04W 40/244* (2013.01); *H04W 8/005* (2013.01); *H04W 84/18* (2013.01)

(58) Field of Classification Search
CPC .............. H04L 63/0861; H04W 4/008; H04W 40/244; H04W 12/06; H04W 8/005; H04W 84/18
See application file for complete search history.

(56) References Cited

U.S. PATENT DOCUMENTS

| 2010/0167646 A1 | 7/2010 | Alameh et al. |
| 2010/0291880 A1 | 11/2010 | Feldstein |
| 2011/0247050 A1 | 10/2011 | Son et al. |
| 2012/0178421 A1* | 7/2012 | Fujii ..................... H04L 63/08 455/411 |
| 2013/0308506 A1 | 11/2013 | Kim et al. |

(Continued)

FOREIGN PATENT DOCUMENTS

| KR | 10-2011-0110565 A | 10/2011 |
| KR | 10-1125141 B1 | 3/2012 |

*Primary Examiner* — Brian D Nguyen
(74) *Attorney, Agent, or Firm* — Jefferson IP Law, LLP

(57) ABSTRACT

An apparatus and a method for identifying at least one pairing subject in an electronic apparatus are provided. The method includes generating detection information of the electronic apparatus, receiving a beacon including detection information of at least one external electronic apparatus from the at least one external electronic apparatus, and identifying the at least one pairing subject among the at least one external electronic apparatus based on a result of comparing the received detection information with the generated detection information.

20 Claims, 16 Drawing Sheets

(56) References Cited

U.S. PATENT DOCUMENTS

| | | | |
|---|---|---|---|
| 2016/0007362 A1* | 1/2016 | Ayadurai | H04W 72/085 370/329 |
| 2016/0066270 A1* | 3/2016 | Hayes | H04W 52/0216 370/254 |
| 2016/0094934 A1* | 3/2016 | Yang | H04W 4/008 455/41.2 |
| 2016/0116291 A1* | 4/2016 | Chien | G01C 21/26 701/519 |
| 2016/0119961 A1* | 4/2016 | Hrabak | H04W 76/023 455/41.2 |

* cited by examiner

ELECTRONIC APPARATUS AND METHOD FOR IDENTIFYING AT LEAST ONE PAIRING SUBJECT IN ELECTRONIC APPARATUS

CROSS-REFERENCE TO RELATED APPLICATION(S)

This application claims the benefit under 35 U.S.C. § 119(a) of a Korean patent application filed on Apr. 17, 2015 in the Korean Intellectual Property Office and assigned Serial number 10-2015-0054708, the entire disclosure of which is hereby incorporated by reference.

TECHNICAL FIELD

The present disclosure relates to an electronic apparatus and a method for identifying at least one pairing subject in an electronic apparatus. More particularly, the present disclosure relates to a method for identifying a pairing subject, which can more clearly and quickly recognize an apparatus, with which the electronic apparatus intends to pair among electronic apparatuses, and can simplify an authentication procedure or can establish a connection with a pairing subject apparatus without a separate authentication procedure.

BACKGROUND

With the progress of mobile communication, users can carry electronic apparatuses on them. An electronic apparatus may be a portable terminal, a smart phone, a wearable device, and the like, each of which can be carried and has one or more of a function capable of performing communication through which voices and images can be transmitted and received, a function capable of inputting/outputting information, and a function capable of storing data.

Such an electronic apparatus has various functions as well as the above-described functions, and recently has a function capable of pairing with an external electronic apparatus by using a wireless communication technique, so that a user often uses the pairing function.

For example, a pairing may be a pairing of a Wi-Fi Direct scheme which is a scheme enabling communication between electronic apparatuses by using a Wi-Fi module, a pairing of a Bluetooth scheme which is a scheme enabling communication between electronic apparatuses by using a Bluetooth module, a pairing of a hotspot scheme or a tethering scheme, and the like.

Typically, each electronic apparatus may scan for an external electronic apparatus, which can be connected and is adjacent to each electronic apparatus, in order to identify the external electronic apparatus, with which each electronic apparatus is to pair, and may display, on a screen thereof, the found external electronic apparatuses so as to enable the selection of a subject, with which each electronic apparatus intends to pair.

However, electronic apparatuses, such as portable terminals, smart phones, and wearable devices, have recently come into wide use, so that each user often uses multiple electronic apparatuses, and a function and a service, which are based on a pairing between electronic apparatuses, are also increased in number. Accordingly, the number of found external electronic apparatuses becomes larger when the electronic apparatus scans for adjacent external electronic apparatuses in order to pair with external electronic apparatuses. As a result, it is expected that it becomes more difficult to recognize which external electronic apparatus is an electronic apparatus, with which the user intends to pair, among the numerous external electronic apparatuses.

In addition, there exists a method for maintaining proximity to or contact with an external electronic apparatus, which is a pairing subject, in such a manner as to directly designate the external electronic apparatus as the pairing subject when electronic apparatuses are paired with each other. However, this method has inconvenience in that it is necessary to continuously maintain a proximity state or a contact state until the pairing subject is identified and the establishment of a connection with the identified pairing subject is completed.

Therefore, a need exists for an electronic apparatus and a method for identifying a pairing subject, which can more clearly and quickly recognize an apparatus, with which the electronic apparatus intends to pair among electronic apparatuses, and can simplify an authentication procedure or can establish a connection with a pairing subject apparatus without a separate authentication procedure.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an electronic apparatus and a method for identifying a pairing subject, which can more clearly and quickly recognize an apparatus, with which the electronic apparatus intends to pair among electronic apparatuses, and can simplify an authentication procedure or can establish a connection with a pairing subject apparatus without a separate authentication procedure.

Another aspect of the present disclosure is to provide an electronic apparatus and a method for identifying a pairing subject, which can perform multiple pairings which allow the electronic apparatus to be simultaneously paired with multiple electronic apparatuses, and thereby can reduce a pairing time period and can improve a user convenience.

In accordance with an aspect of the present disclosure, a method for identifying at least one pairing subject in an electronic apparatus is provided. The method includes generating detection information of the electronic apparatus, receiving a beacon including detection information of at least one external electronic apparatus from the at least one external electronic apparatus, and identifying the at least one pairing subject among the at least one external electronic apparatus based on a result of comparing the received detection information with the generated detection information.

In accordance with another aspect of the present disclosure, an electronic apparatus is provided. The electronic apparatus includes a communication unit configured to receive a beacon including detection information of at least one external electronic apparatus from the at least one external electronic apparatus and a control unit configured to generate detection information of the electronic apparatus, and identify at least one pairing subject among the at least one external electronic apparatus based on a result of comparing the received detection information with the generated detection information.

According to various embodiments of the present disclosure, use is made of a beacon which includes detection information corresponding to an action previously set for pairing and is transmitted and received between multiple electronic apparatuses when the multiple electronic apparatuses are paired with each other. Therefore, although multiple devices exist in the vicinity, a user can clearly and quickly recognize a pairing subject electronic apparatus without a separate search for the pairing subject electronic apparatus or a separate authentication procedure.

In addition, according to various embodiments of the present disclosure, multiple electronic apparatuses can be paired with each other without a need to maintain proximity to or continuous contact with at least one pairing subject electronic apparatus, when the multiple electronic apparatuses are paired with each other. Accordingly, a user convenience can be improved.

Further, according to various embodiments of the present disclosure, when multiple electronic apparatuses are paired with each other, at least one pairing subject electronic apparatus is identified based on detection information corresponding to an action previously set for pairing without using a service set identifier (SSID) of each electronic apparatus. Therefore, it is possible to perform multiple pairings which enable an electronic apparatus to be simultaneously paired with multiple electronic apparatuses.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
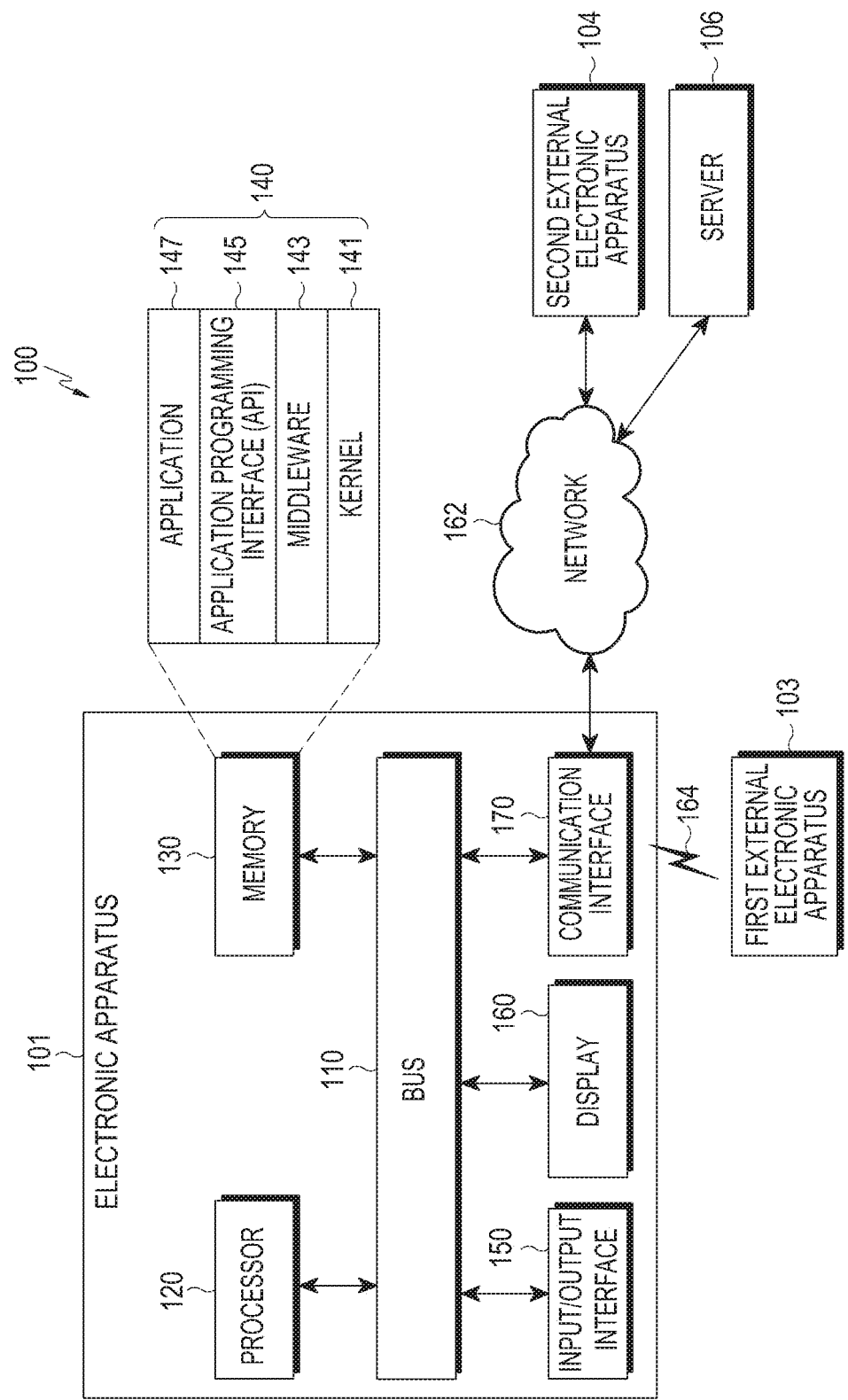
FIG. 1 illustrates a network environment according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

As used herein, the expression "have", "may have", "include", or "may include" refers to the existence of a corresponding feature (e.g., a numeral, a function, an operation, or a constituent element, such as a component), and does not exclude one or more additional features.

In various embodiments of the present disclosure, the expression "A or B", "at least one of A or/and B", or "one or more of A or/and B" may include all possible combinations of the items listed. For example, the expression "A or B", "at least one of A and B", or "at least one of A or B" refers to all of (1) including at least one A, (2) including at least one B, or (3) including all of at least one A and at least one B.

The expression "a first", "a second", "the first", or "the second" used in various embodiments of the present disclosure may modify various components regardless of the order and/or the importance but does not limit the corresponding components. For example, a first user device and a second user device indicate different user devices although both of them are user devices. For example, a first element may be termed a second element, and similarly, a second element may be termed a first element without departing from the scope of the present disclosure.

It should be understood that when an element (e.g., first element) is referred to as being (operatively or communicatively) "connected," or "coupled," to another element (e.g., second element), it may be directly connected or coupled directly to the other element or any other element (e.g., third element) may be interposer between them. In contrast, it may be understood that when an element (e.g., first element) is referred to as being "directly connected," or "directly coupled" to another element (second element), there are no element (e.g., third element) interposed between them.

The expression "configured to" used in various embodiments of the present disclosure may be exchanged with, for example, "suitable for", "having the capacity to", "designed to", "adapted to", "made to", or "capable of" according to the situation. The term "configured to" may not necessarily imply "specifically designed to" in hardware. Alternatively, in some situations, the expression "device configured to" may mean that the device, together with other devices or components, "is able to". For example, the phrase "processor adapted (or configured) to perform A, B, and C" may mean a dedicated processor (e.g. embedded processor) only for performing the corresponding operations or a generic-purpose processor (e.g., central processing unit (CPU) or application processor (AP)) that can perform the corresponding operations by executing one or more software programs stored in a memory device.

The terms used herein are merely for the purpose of describing particular embodiments of the present disclosure and are not intended to limit the scope of other embodiments. Unless defined otherwise, all terms used herein, including technical terms and scientific terms, may have the same meaning as commonly understood by a person of ordinary skill in the art to which the present disclosure pertains. Such terms as those defined in a generally used dictionary may be interpreted to have the meanings equal to the contextual meanings in the relevant field of art, and are not to be interpreted to have ideal or excessively formal meanings unless clearly defined in embodiments of the present disclosure. In some cases, even the term defined in various embodiments of the present disclosure should not be interpreted to exclude embodiments of the present disclosure.

An electronic device according to various embodiments of the present disclosure may include at least one of, for example, a smart phone, a tablet personal computer (PC), a mobile phone, a video phone, an electronic book reader (e-book reader), a desktop PC, a laptop PC, a netbook computer, a workstation, a server, a personal digital assistant (PDA), a portable multimedia player (PMP), a moving picture experts group (MPEG-1 or MPEG-2) audio layer-3 (MP3) player, a mobile medical device, a camera, and a wearable device. According to various embodiments of the present disclosure, the wearable device may include at least one of an accessory type (e.g., a watch, a ring, a bracelet, an anklet, a necklace, a glasses, a contact lens, or a head-mounted device (HMD)), a fabric or clothing integrated type (e.g., an electronic clothing), a body-mounted type (e.g., a skin pad, or tattoo), and a bio-implantable type (e.g., an implantable circuit).

According to various embodiments of the present disclosure, the electronic device may be a home appliance. The home appliance may include at least one of, for example, a television, a digital versatile disc (DVD) player, an audio, a refrigerator, an air conditioner, a vacuum cleaner, an oven, a microwave oven, a washing machine, an air cleaner, a set-top box, a home automation control panel, a security control panel, a television (TV) box (e.g., Samsung Home-Sync™, Apple TV™, or Google TV™), a game console (e.g., Xbox™ and PlayStation™), an electronic dictionary, an electronic key, a camcorder, and an electronic photo frame.

According to an embodiment of the present disclosure, the electronic device may include at least one of various medical devices (e.g., various portable medical measuring devices (i.e., a blood glucose monitoring device, a heart rate monitoring device, a blood pressure measuring device, a body temperature measuring device, and the like), a magnetic resonance angiography (MRA), a magnetic resonance imaging (MRI), a computed tomography (CT) machine, an ultrasonic machine, and the like), a navigation device, a global positioning system (GPS) receiver, an event data recorder (EDR), a flight data recorder (FDR), a vehicle infotainment devices, an electronic devices for a ship (e.g., a navigation device for a ship, and a gyro-compass), avionics, security devices, an automotive head unit, a robot for home or industry, an automatic teller's machine (ATM) in banks, point of sales (POS) in a shop, or internet device of things (e.g., a light bulb, various sensors, electric or gas meter, a sprinkler device, a fire alarm, a thermostat, a streetlamp, a toaster, a sporting goods, a hot water tank, a heater, a boiler, and the like).

According to various embodiments of the present disclosure, the electronic device may include at least one of a part of furniture or a building/structure, an electronic board, an electronic signature receiving device, a projector, and various kinds of measuring instruments (e.g., a water meter, an electric meter, a gas meter, and a radio wave meter). The electronic device according to various embodiments of the present disclosure may be a combination of one or more of the aforementioned various devices. The electronic device according to some embodiments of the present disclosure may be a flexible device. Further, the electronic device according to an embodiment of the present disclosure is not limited to the aforementioned devices, and may include a new electronic device according to the development of technology Hereinafter, an electronic device according to various embodiments of the present disclosure will be described with reference to the accompanying drawings. As used herein, the term "user" may indicate a person who uses an electronic device or a device (e.g., an artificial intelligence electronic device) that uses an electronic device.

FIG. 1 illustrates a network environment according to an embodiment of the present disclosure.

Referring to FIG. 1, an electronic apparatus 101 within a network environment 100 according to various embodiments of the present disclosure will be described. The electronic apparatus 101 may include a bus 110, a processor 120, a memory 130, an input/output interface 150, a display 160, and a communication interface 170. In some embodiments of the present disclosure, at least one of the above elements of the electronic apparatus 101 may be omitted from the electronic apparatus 101, or the electronic apparatus 101 may additionally include other elements.

The bus 110 may include, for example, a circuit which interconnects the elements 110 to 170 and delivers a communication (e.g., a control message and/or data) between the elements 110 to 170.

The processor 120 may include one or more of a CPU, an AP, and a communication processor (CP). The processor 120 may perform, for example, calculations or data processing related to control over and/or communication by at least one of the other elements of the electronic apparatus 101.

The memory 130 may include a volatile memory and/or a non-volatile memory. The memory 130 may store, for example, commands or data related to at least one of the other elements of the electronic apparatus 101. According to an embodiment of the present disclosure, the memory 130 may store software and/or a program 140. The program 140 may include, for example, a kernel 141, middleware 143, an application programming interface (API) 145, and/or an application program (or an application) 147. At least some of the kernel 141, the middleware 143, and the API 145 may be referred to as an "operating system (OS)."

For example, the kernel 141 may control or manage system resources (e.g., the bus 110, the processor 120, the memory 130, and the like) used to execute operations or functions implemented by the other programs (e.g., the middleware 143, the API 145, and the application program 147). In addition, the kernel 141 may provide an interface capable of controlling or managing the system resources by accessing the individual elements of the electronic apparatus 101 by using the middleware 143, the API 145, or the application program 147.

For example, the middleware 143 may serve as an intermediary that enables the API 145 or the application program 147 to communicate with the kernel 141 and to exchange data therewith.

In addition, the middleware 143 may process one or more task requests received from the application program 147 according to a priority. For example, the middleware 143 may assign a priority, which enables the use of system resources (e.g., the bus 110, the processor 120, the memory 130, and the like) of the electronic apparatus 101, to at least one of the application programs 147. For example, the middleware 143 may perform scheduling, loading balancing, and the like of the one or more task requests by processing the one or more task requests according to the priority assigned to the at least one of the application programs 147.

The API 145 is, for example, an interface through which the application 147 controls a function provided by the kernel 141 or the middleware 143, and may include, for example, at least one interface or function (e.g., command) for file control, window control, image processing, character control, and the like.

For example, the input/output interface 150 may serve as an interface capable of delivering a command or data, which is input from a user or another external device, to the element(s) other than the input/output interface 150 within the electronic apparatus 101. In addition, the input/output interface 150 may output, to the user or another external device, commands or data received from the element(s) other than the input/output interface 150 within the electronic apparatus 101.

Examples of the display 160 may include a liquid crystal display (LCD), a light-emitting diode (LED) display, an organic LED (OLED) display, a microelectromechanical systems (MEMS) display, and an electronic paper display. For example, the display 160 may display various pieces of content (e.g., a text, images, videos, icons, symbols, and the like) to the user. The display 160 may include a touch screen, and may receive, for example, a touch input, a gesture input, a proximity input, or a hovering input provided by an electronic pen or a body part of the user.

The communication interface 170 may establish, for example, communication between the electronic apparatus 101 and an external apparatus (e.g., a first external electronic apparatus 103, a second external electronic apparatus 104, or a server 106). For example, the communication interface 170 may be connected to a network 162 through wireless or wired communication and may communicate with the external device (e.g., the second external electronic apparatus 104 or the server 106).

The wireless communication may be performed by using at least one of, for example, long-term evolution (LTE), LTE-advanced (LTE-A), code division multiple access (CDMA), wideband CDMA (WCDMA), universal mobile telecommunications system (UMTS), wireless broadband (WiBro), and global system for mobile communications (GSM), as a cellular communication protocol. In addition, examples of the wireless communication may include short-range communication 164. The short-range communication 164 may be performed by using at least one of, for example, Wi-Fi, Bluetooth (BT), near field communication (NFC), and global navigation satellite system (GNSS). The GNSS may include at least one of, for example, a GPS, a global navigation satellite system (GLONASS), a BeiDou navigation satellite system (hereinafter referred to as "BeiDou"), and a European global satellite-based navigation system (Galileo), according to a use area, a bandwidth, and the like. Hereinafter, in various embodiments of the present disclosure, the term "GPS" may be interchangeably used with the term "GNSS." The wired communication may be performed by using at least one of, for example, a universal serial bus (USB), a high definition multimedia interface (HDMI), recommended standard 232 (RS-232), and a plain old telephone service (POTS). The network 162 may include at least one of communication networks, such as a computer network (e.g., a local area network (LAN), or a wide area network (WAN)), the Internet, and a telephone network.

Each of the first external electronic apparatus 103 and the second external electronic apparatus 104 may be of a type identical to or different from that of the electronic apparatus 101. According to an embodiment of the present disclosure, the server 106 may include a group of one or more servers.

According to various embodiments of the present disclosure, all or some of operations performed by the electronic apparatus 101 may be performed by another electronic apparatus or multiple electronic apparatuses (e.g., the first external electronic apparatus 103 and the second external electronic apparatus 104 or the server 106). According to an embodiment of the present disclosure, when the electronic apparatus 101 needs to perform some functions or services automatically or by a request, the electronic apparatus 101 may transmit, to another device (e.g., the first external electronic apparatus 103, the second external electronic apparatus 104, or the server 106), a request for performing at least some functions related to the functions or services, instead of performing the functions or services by itself, or additionally. Another electronic apparatus may execute the requested functions or the additional functions, and may deliver a result of the execution to the electronic apparatus 101. The electronic apparatus 101 may process the received result without any change or additionally and may provide the requested functions or services. To this end, use may be made of, for example, cloud computing technology, distributed computing technology, or client-server computing technology.

Figure 2:
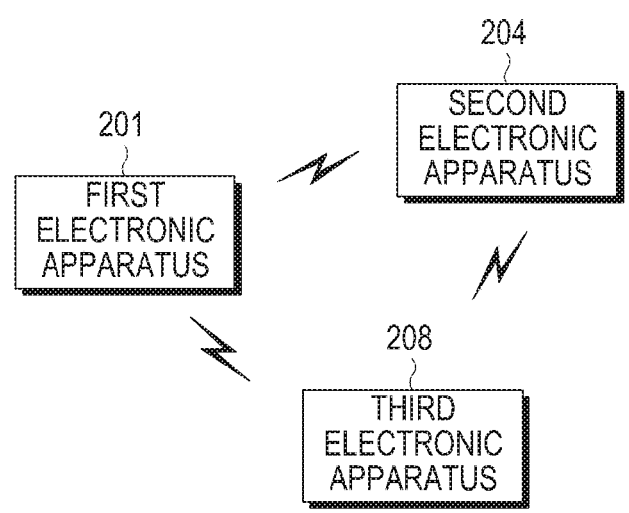
FIG. 2 illustrates a pairing between multiple electronic apparatuses according to an embodiment of the present disclosure.

FIG. 2 illustrates a pairing between multiple electronic apparatuses according to an embodiment of the present disclosure.

Referring to FIG. 2, each of a first electronic apparatus 201, a second electronic apparatus 204, and a third electronic apparatus 208 may receive a beacon including detection information, that each of the other electronic apparatuses has advertised to each of the first electronic apparatus 201, the second electronic apparatus 204, and the third electronic apparatus 208, may identify at least one pairing subject determined based on a result of comparing the received detection information with detection information thereof, and may establish a connection between the electronic apparatuses through a connection request message and a corresponding connection request response message which are transmitted and received to/from the identified at least one pairing subject by using a wireless communication scheme. In the present example, the beacon is a wireless signal periodically transmitted so that an electronic apparatus may advertise the existence and location thereof to adjacent electronic apparatuses through short-range wireless communication.

In various embodiments of the present disclosure, the electronic apparatus includes the detection information thereof in the beacon and advertises the beacon including the detection information thereof to the adjacent electronic apparatuses. However, embodiments of the present disclosure are not limited thereto, and thus various forms of beacons may be transmitted to adjacent electronic apparatuses.

According to an embodiment of the present disclosure, a pairing between the first electronic apparatus 201 and the third electronic apparatus 208 may be a pairing between smart phones, a pairing between a wearable device and a smart phone, a pairing between wearable devices, and the like. In addition, examples of the pairing between the first electronic apparatus 201 and the third electronic apparatus 208 may include a pairing between various forms of electronic apparatuses.

Figure 3:
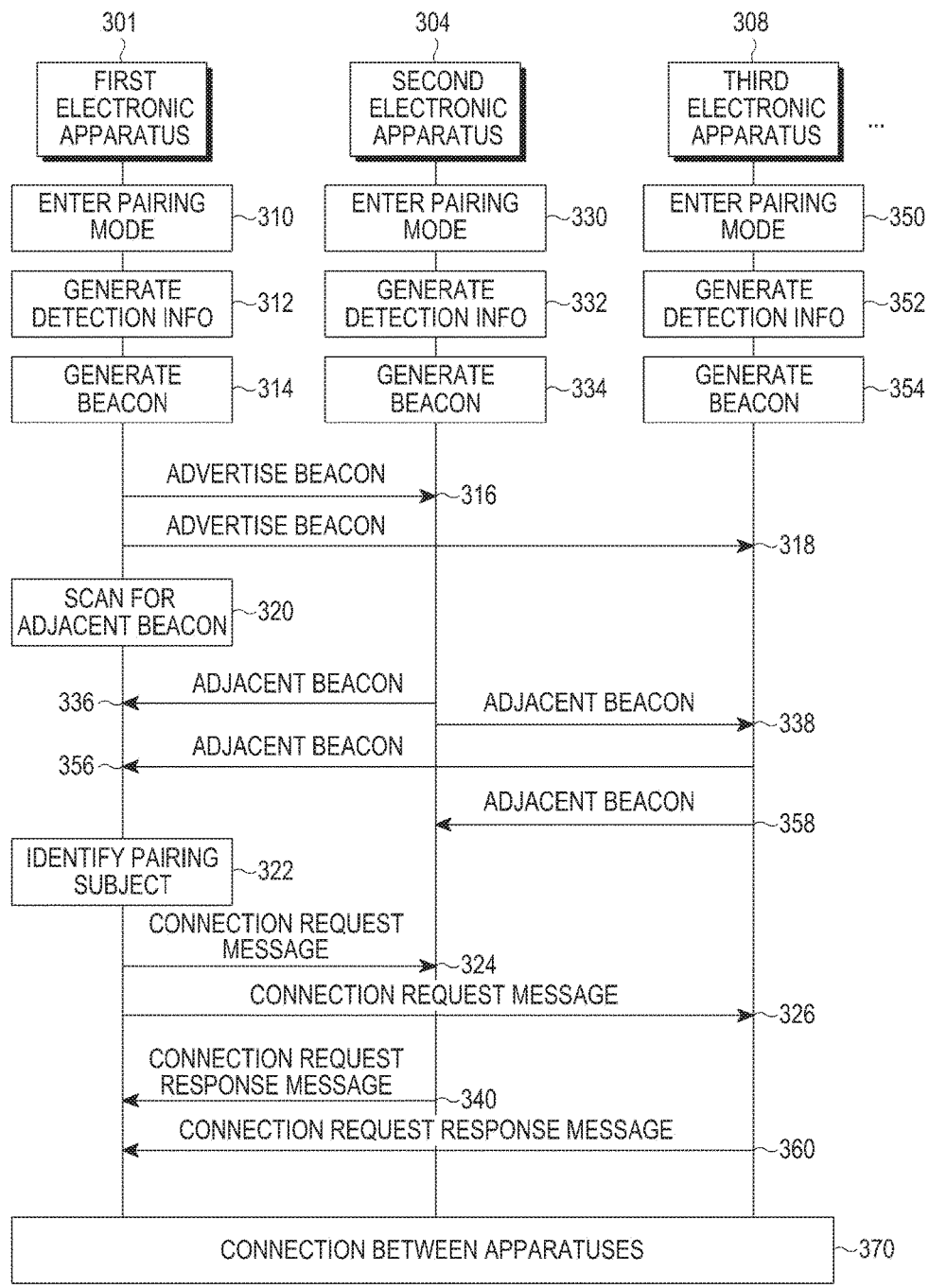
FIG. 3 illustrates a pairing process between multiple electronic apparatuses according to an embodiment of the present disclosure.

FIG. 3 illustrates a pairing process between multiple electronic apparatuses according to an embodiment of the present disclosure.

Referring to FIG. 3, in operations 310, 330 and 350, each of a first electronic apparatus 301, a second electronic apparatus 304, and a third electronic apparatus 308 may enter a pairing mode.

According to an embodiment of the present disclosure, each of the first electronic apparatus 301, the second electronic apparatus 304, and the third electronic apparatus 308 may perform a pairing through a communication unit, such as the communication interface 170 illustrated in FIG. 1, according to a pairing request from the user. The pairing request may include the execution of a certain application which enables information required between devices to be shared and exchanged. For example, the application may include a menu for sharing a file in a media player. Alternatively, the application may include a dedicated application for sharing.

According to an embodiment of the present disclosure, each of the first electronic apparatus 301, the second electronic apparatus 304, and the third electronic apparatus 308 may automatically perform a pairing through a communication unit, such as the communication interface 170 illustrated in FIG. 1, according to a pre-designated condition. The pre-designated condition may include at least one of, for example, a case where an electronic apparatus enters an area pre-designated to perform a pairing, a case where a pre-designated pairing subject electronic apparatus (e.g., the second electronic apparatus 304 and the third electronic apparatus 308) exists at close range, a case where a change in light is detected by an illuminance sensor and the like, and a case where a certain communication module is turned on which supports a pairing function or a pairing service.

According to an embodiment of the present disclosure, each of the first electronic apparatus 301, the second electronic apparatus 304, and the third electronic apparatus 308 may enter the pairing mode at a pairing request from an external electronic apparatus.

In operations 312, 332 and 352, each of the first electronic apparatus 301, the second electronic apparatus 304, and the third electronic apparatus 308 may generate detection information based on a detection value detected by a sensor included in each of the first electronic apparatus 301, the second electronic apparatus 304, and the third electronic apparatus 308, according to an action previously set for pairing which is simultaneously performed in the first electronic apparatus 301, the second electronic apparatus 304, and the third electronic apparatus 308.

According to an embodiment of the present disclosure, the action previously set for pairing may include at least one of an action, with which the user holds, in one hand of the user, and shakes or rotates two or more electronic apparatuses (e.g., the first electronic apparatus 301, the second electronic apparatus 304, and the third electronic apparatus 308), with which the user intends to pair, an action, with which the user simultaneously moves the two or more electronic apparatuses, with which the user intends to pair, in an identical direction and at an identical speed, an action, with which the user brings the two or more electronic apparatuses, with which the user intends to pair, into a change in illuminance in an identical environment, and an action, with which the user provides biometric information of the user through each of biometric recognition sensors included in the two or more electronic apparatuses, with which the user intends to pair.

In operations 314, 334 and 354, each of the first electronic apparatus 301, the second electronic apparatus 304, and the third electronic apparatus 308 may generate a beacon including the detection information generated based on the detection value.

In operations 316, 318, 336, 338, 356 and 358, each of the first electronic apparatus 301, the second electronic apparatus 304, and the third electronic apparatus 308 may advertise the generated beacon to adjacent electronic apparatuses through a communication unit, such as the communication interface 170 illustrated in FIG. 1.

Hereinafter, in order to facilitate a description of the present disclosure, a case will be described in which an electronic apparatus that scans for a pairing subject is the first electronic apparatus 301 and an external electronic apparatus which becomes a pairing subject is at least one of the second electronic apparatus 304 and the third electronic apparatus 308.

According to an embodiment of the present disclosure, the first electronic apparatus 301, which scans for a pairing subject, may omit operation 314 of generating the beacon and operations 316 and 318 of advertising the generated beacon. In addition, operations 316 and 318 of advertising the generated beacon by the first electronic apparatus 301 may be performed in any operation after operation 314 of generating the beacon. In operation 320, the first electronic apparatus 301 may scan for the adjacent external electronic apparatuses 304 and 308.

In operations 336 and 356, the first electronic apparatus 301 may receive, from at least one of the external electronic apparatuses 304 and 308, the beacon including the detection information generated based on the detection value detected by a sensor of each of the external electronic apparatuses 304 and 308.

In operation 322, the first electronic apparatus 301 may identify at least one pairing subject among at least one of the external electronic apparatuses 304 and 308 based on a result of comparing the detection information thereof with the detection information of at least one of the external electronic apparatuses 304 and 308.

According to an embodiment of the present disclosure, when the result of the comparison shows that a preset pairing condition is satisfied, the first electronic apparatus 301 may determine, based on the result of the comparison, that at least one of the external electronic apparatuses 304 and 308 is the at least one pairing subject. In contrast, when the result of the comparison shows that the preset pairing condition is not satisfied, the first electronic apparatus 301 may determine, based on the result of the comparison, that at least one of the external electronic apparatuses 304 and 308 is not the at least one pairing subject.

In operation 322, when it is determined, as a result of identifying the pairing subject, that at least one of the external electronic apparatuses 304 and 308 is the at least one pairing subject, in operations 324 and 326, the first electronic apparatus 301 may transmit a connection request message to at least one of the external electronic apparatuses 304 and 308. The connection request message may include identifier information representing the first electronic apparatus 301 itself.

In operations 340 and 360, at least one of the external electronic apparatuses 304 and 308 may generate a connection request response message in response to the connection request message transmitted by the first electronic apparatus 301, and then may transmit the connection request response message to the first electronic apparatus 301, according to the identifier information included in the connection request message.

According to an embodiment of the present disclosure, the connection request response message may include one of a connection acceptance message which represents connection acceptance and a connection rejection message which represents connection rejection.

In operations 340 and 360, the first electronic apparatus 301 may receive the connection request response message from at least one of the external electronic apparatuses 304 and 308 by using a wireless communication scheme. According to an embodiment of the present disclosure, the connection request response message received by the first electronic apparatus 301 may include one of a connection acceptance message and a connection rejection message.

When the connection request response message includes a connection acceptance message, in operation 370, the first electronic apparatus 301 may establish a connection with at least one of the external electronic apparatuses 304 and 308 through a communication unit, such as the communication interface 170 illustrated in FIG. 1, and may transmit and receive data to/from at least one of the external electronic apparatuses 304 and 308 in order to exchange or share an application or data between the first electronic apparatus 301 and at least one of the external electronic apparatuses 304 and 308. In contrast, when the connection request response message includes a connection rejection message, the first electronic apparatus 301 may not be connected with at least one of the external electronic apparatuses 304 and 308.

Meanwhile, according to an embodiment of the present disclosure, at least one of the external electronic apparatuses 304 and 308 may automatically perform a connection acceptance to the connection request transmitted by the first electronic apparatus 301. For example, a connection may be established without a separate user confirmation process, when the connection request is received from a user who has a history of having previously been connected to at least one of the external electronic apparatuses 304 and 308, a user whose contact is registered, a user who is registered in a social service, such as a social network service (SNS), and the like, a user who is authenticated for a designated application or a designated service, and the like, that the identifier information included in the connection request message indicates.

According to an embodiment of the present disclosure, the first electronic apparatus 301 may perform, simultaneously and in common with at least one of the external electronic apparatuses 304 and 308, an action previously set for pairing with at least one of the external electronic apparatuses 304 and 308, with which the first electronic apparatus 301 intends to pair. Accordingly, the first electronic apparatus 301 may easily identify at least one pairing subject among at least one of the external electronic apparatuses 304 and 308 based on a result of comparing detection information thereof with detection information of at least one of the external electronic apparatuses 304 and 308 among the pieces of detection information generated based on the detection values detected by the sensors included in the first electronic apparatus 301, the second electronic apparatus 304, and the third electronic apparatus 308. When identifying the pairing subject in this manner, the first electronic apparatus 301 may determine that authentication is already achieved between the first electronic apparatus 301 and at least one of the external electronic apparatuses 304 and 308, with which the first electronic apparatus 301 intends to pair, and may directly establish a connection without an authentication procedure, such as a separate acceptance or input of a password.

Figure 4:
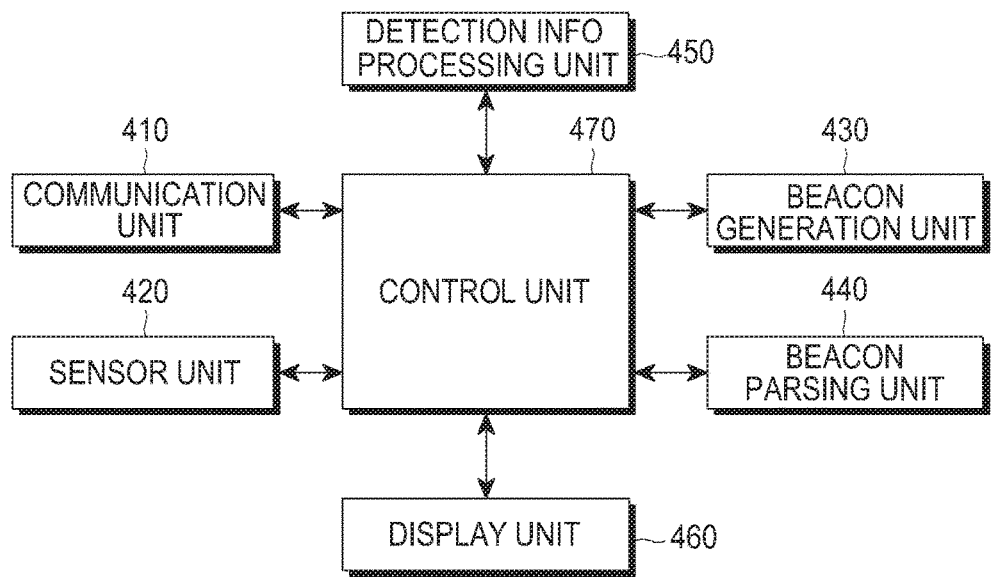
FIG. 4 is a block diagram schematically illustrating a configuration of an electronic apparatus according to an embodiment of the present disclosure.

FIG. 4 is a block diagram schematically illustrating a configuration of an electronic apparatus according to an embodiment of the present disclosure.

Referring to FIG. 4, an electronic apparatus 400 according to an embodiment of the present disclosure may include a communication unit 410, a sensor unit 420, a beacon generation unit 430, a beacon parsing unit 440, a detection information processing unit 450, a display unit 460, and a control unit 470. The electronic apparatus 400 may include the whole or part of the electronic apparatus 101 illustrated in FIG. 1.

The communication unit 410 may receive, from at least one external electronic apparatus, a beacon including detection information generated by the external electronic apparatus.

The sensor unit 420 may detect a detection value corresponding to an action previously set for pairing.

The action previously set for pairing may include at least one of, for example, an action, with which the user holds, in one hand of the user, and shakes or rotates two or more electronic apparatuses, with which the user intends to pair, an action, with which the user simultaneously moves the two or more electronic apparatuses, with which the user intends to pair, in an identical direction and at an identical speed, an action, with which the user brings the two or more electronic apparatuses, with which the user intends to pair, into a change in illuminance in an identical environment, and an action, with which the user provides biometric information of the identical user through each of biometric recognition sensors included in the two or more electronic apparatuses, with which the user intends to pair. However, examples of the action previously set for pairing are not limited thereto, and may include all various actions simultaneously performed in the two or more electronic apparatuses, with which the user intends to pair, in addition to the above-described actions.

The sensor unit 420 may include at least one of an acceleration sensor, a motion sensor, an illuminance sensor, a biometric sensor, and a pressure sensor.

According to an embodiment of the present disclosure, the sensor unit 420 may detect an acceleration detection value corresponding to an action previously set for pairing (e.g., the action, with which the user holds, in one hand of the user, and shakes or rotates the two or more electronic apparatuses) through the acceleration sensor.

According to an embodiment of the present disclosure, the sensor unit 420 may detect a motion detection value corresponding to an action previously set for pairing (e.g., the action, with which the user moves the two or more electronic apparatuses in an identical direction and at an identical speed) through the motion sensor.

According to an embodiment of the present disclosure, the sensor unit 420 may detect an illuminance detection value corresponding to an action previously set for pairing (e.g., the action, with which the user brings the two or more electronic apparatuses into a change in illuminance in an identical environment) through the illuminance sensor.

According to an embodiment of the present disclosure, the sensor unit 420 may detect an illuminance detection value or a motion detection value (or an acceleration detection value) corresponding to an action previously set for pairing (e.g., the action, with which the user moves at least another electronic apparatus above at least one electronic apparatus) through the illuminance sensor or the motion sensor.

According to an embodiment of the present disclosure, the sensor unit 420 may detect a biometric information detection value corresponding to an action previously set for pairing (e.g., the action, with which the user provides biometric information of the identical user to the two or more electronic apparatuses) through the biometric sensor.

Examples of the sensor unit 420 are not limited thereto, and may include all various sensors each capable of detecting a detection value corresponding to an action previously set for pairing.

The beacon generation unit 430 may generate a beacon packet including the detection information and apparatus identification information detected by the sensor unit 420.

Figure 5:
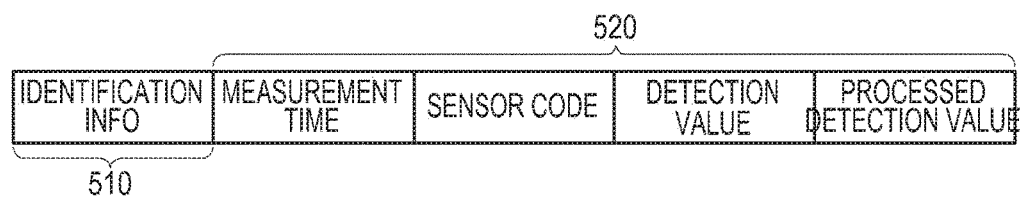
FIG. 5 illustrates a configuration of a beacon packet according to an embodiment of the present disclosure.

The beacon generation unit 430 may generate a beacon including at least one beacon packet based on the number of sensors of the sensor unit 420. The control unit 470 may advertise the beacon generated by the beacon generation unit 430 to the at least one external electronic apparatus through the communication unit 410. Referring to FIG. 5, a configuration of the beacon packet will be described in detail.

FIG. 5 illustrates a configuration of a beacon packet according to an embodiment of the present disclosure.

Referring to FIG. 5, the beacon packet may include apparatus identification information 510, such as an apparatus identifier (ID), and detection information 520 generated based on a detection value measured by the sensor unit 420.

The apparatus identification information 510 is used to identify an apparatus, and may be a unique identification number assigned to each apparatus. For example, the apparatus identification information may include at least one of international mobile equipment identity (IMEI), international mobile subscriber identity (IMSI), a mobile subscriber integrated services digital network number (MSISDN), a media access control (MAC) address, a unique user ID (UUID), a unique device ID (UDID), and a user account.

The detection information 520 may include at least one of measurement time, a sensor code, and a detection value.

The measurement time may be time information at a time point when the detection value is detected by the sensor unit 420 according to an action previously set for pairing.

The sensor code is a code value pre-defined according to the type of the sensor unit 420, and may be code information which enables the identification of the type of sensor. Specifically, when sensors included in respective devices are all of an identical type although the devices are of different types as in the case of a smart phone and a smart watch, the devices all have an identical sensor code. When sensors included in respective devices are of different types although the devices are all of an identical type, the devices have different sensor codes.

The detection value may be information, which is received as input from a sensor corresponding to each sensor code, namely, information representing a detection value detected by the relevant sensor.

According to an embodiment of the present disclosure, examples of the detection value may include multiple values, including an initial value from which a sensor begins to perform measurement, and a final value with which a sensor completes measurement.

According to an embodiment of the present disclosure, the detection value may include at least one of an acceleration detection value, a motion detection value, an illuminance detection value, and a biometric detection value.

The detection information 520 may further include a processed detection value.

The processed detection value may be information representing a detection value partially extracted or processed based on at least one of the detection value and the measurement time.

According to an embodiment of the present disclosure, the processed detection value may include at least one of a value partially extracted from the detection value, a change pattern of the detection value according to the measure time, a measurement time point corresponding to an inflection point of the detection value, and information (e.g., coding information, into which the detection value is converted) generated based on the detection value.

Referring again to FIG. 4, the beacon parsing unit 440 may parse a beacon received from at least one external electronic apparatus, and may acquire apparatus identification information and detection information of the external electronic apparatus from at least one beacon packet included in the beacon. The beacon packet received from the at least one external electronic apparatus may have a structure identical to that of the beacon packet described with reference to FIG. 5. The detection information acquired from the at least one external electronic apparatus may include at least one of measurement time, a sensor code, and a detection value which are detected by the sensor unit included in the at least one external electronic apparatus. The detection information detected by the sensor unit of the at least one external electronic apparatus may further include a processed detection value.

The detection information processing unit 450 may generate a processed detection value based on at least one of a detection value and measurement time detected by the sensor unit 420.

According to an embodiment of the present disclosure, the detection information processing unit 450 may generate a processed detection value by partially extracting the detection value. For example, when the detection value is biometric information acquired by the biometric sensor, the detection information processing unit 450 may generate information partially extracted from the biometric information so as to use, for security, only a part of the acquired biometric information rather than using the whole thereof.

According to an embodiment of the present disclosure, the detection information processing unit 450 may generate a processed detection value by patterning a change in the detection value according to the measurement time by using the measurement time and the detection value.

According to an embodiment of the present disclosure, the detection information processing unit 450 may generate a processed detection value by extracting a measurement time point corresponding to an inflection point of the detection value by using the measurement time and the detection value.

According to an embodiment of the present disclosure, the detection information processing unit 450 may generate a processed detection value based on the detection value. For example, when the detection value is an image (e.g., an iris image), the detection information processing unit 450 may segment the image through a certain pre-process, may perform a polar transform on the segmented image, may extract a feature point which is based on polar coordinates in the transformed image, and may convert the extracted feature point into coding information.

The display unit 460 may display, on the screen thereof, at least one pairing subject identified among at least one of the external electronic apparatuses. In addition, the display unit 460 may display, on the screen thereof, a connection request message requested by at least one of the external electronic apparatuses.

The control unit 470 may identify at least one pairing subject among at least one of the external electronic apparatuses based on a result of comparing detection information, which has been generated based on the detection value detected by the sensor unit 420, with detection information received from at least one of the external electronic apparatuses through the communication unit 410 and acquired by the beacon parsing unit 440.

The detection information may include at least one of a sensor code corresponding to the sensor type of a sensor unit included in each electronic apparatus, a detection value detected by a sensor corresponding to the sensor code, and measurement time at a time point when the detection value is detected.

The detection information may further include a processed detection value partially extracted or processed based on at least one of the detection value and the measurement time. The processed detection value may include at least one of a value partially extracted from the detection value, a change pattern of the detection value according to the measure time, a measurement time point corresponding to an inflection point of the detection value, and coding information converted based on the detection value.

According to an embodiment of the present disclosure, the control unit 470 may calculate a difference in measurement time by comparing measurement time detected by the sensor unit 420 with measurement time detected by a sensor unit of at least one external electronic apparatus. The control unit 470 may determine whether the calculated difference in the measurement time is within a preset allowable value. When the calculated difference in the measurement time is within the preset allowable value, the control unit 470 may determine that the at least one external electronic apparatus is the at least one pairing subject. In contrast, when the calculated difference in the measurement time is greater than the preset allowable value, the control unit 470 may determine that the at least one external electronic apparatus is not the at least one pairing subject.

According to an embodiment of the present disclosure, when a sensor code detected by the sensor unit 420 is identical to a sensor code detected by the sensor unit of the at least one external electronic apparatus, the control unit 470 may calculate a difference in a detection value by comparing a detection value detected by the sensor unit 420 with a detection value detected by the sensor unit of the at least one external electronic apparatus. The control unit 470 may determine whether the calculated difference in the detection value is within a preset allowable value. When the calculated difference in the detection value is within the preset allowable value, the control unit 470 may determine that the at least one external electronic apparatus is the at least one pairing subject. In contrast, when the calculated difference in the detection value is greater than the preset allowable value, the control unit 470 may determine that the at least one external electronic apparatus is not the at least one pairing subject.

According to an embodiment of the present disclosure, when a difference between a detection value detected by the sensor unit 420 and a detection value detected by the sensor unit of the at least one external electronic apparatus is greater than the preset allowable value, the control unit 470 may calculate a difference in a processed detection value by comparing a processed detection value processed by the detection information processing unit 450 of the electronic apparatus 400 with a processed detection value generated by the at least one external electronic apparatus. The control unit 470 may determine whether the calculated difference in the processed detection value is within a preset allowable value. When the calculated difference in the processed detection value is within the preset allowable value, the control unit 470 may determine that the at least one external electronic apparatus is the at least one pairing subject. In contrast, when the calculated difference in the processed detection value is greater than the preset allowable value, the control unit 470 may determine that the at least one external electronic apparatus is not the at least one pairing subject.

According to an embodiment of the present disclosure, when a sensor code detected by the sensor unit 420 is not identical to a sensor code detected by the sensor unit of the at least one external electronic apparatus, the control unit 470 may calculate a difference in a processed detection value by comparing a processed detection value generated by the detection information processing unit 450 of the electronic apparatus 400 with a processed detection value generated by the at least one external electronic apparatus. When the calculated difference in the processed detection value is within a preset allowable value, the control unit 470 may determine that the at least one external electronic apparatus is the at least one pairing subject. In contrast, when the calculated difference in the processed detection value is greater than the preset allowable value, the control unit 470 may determine that the at least one external electronic apparatus is not the at least one pairing subject.

Meanwhile, according to an embodiment of the present disclosure, when a difference between measurement time detected by the sensor unit 420 and measurement time detected by the sensor unit of the at least one external electronic apparatus is greater than a preset allowable value, the control unit 470 may determine that the at least one external electronic apparatus is not the at least one pairing subject.

According to an embodiment of the present disclosure, when a difference between a detection value detected by the sensor unit 420 and a detection value detected by the sensor unit of the at least one external electronic apparatus is greater than a preset allowable value, the control unit 470 may determine that the at least one external electronic apparatus is not the at least one pairing subject.

According to an embodiment of the present disclosure, when a difference between a processed detection value detected by the sensor unit 420 and a processed detection value detected by the sensor unit of the at least one external electronic apparatus is greater than a preset allowable value, the control unit 470 may determine that the at least one external electronic apparatus is not the at least one pairing subject.

Figure 6:
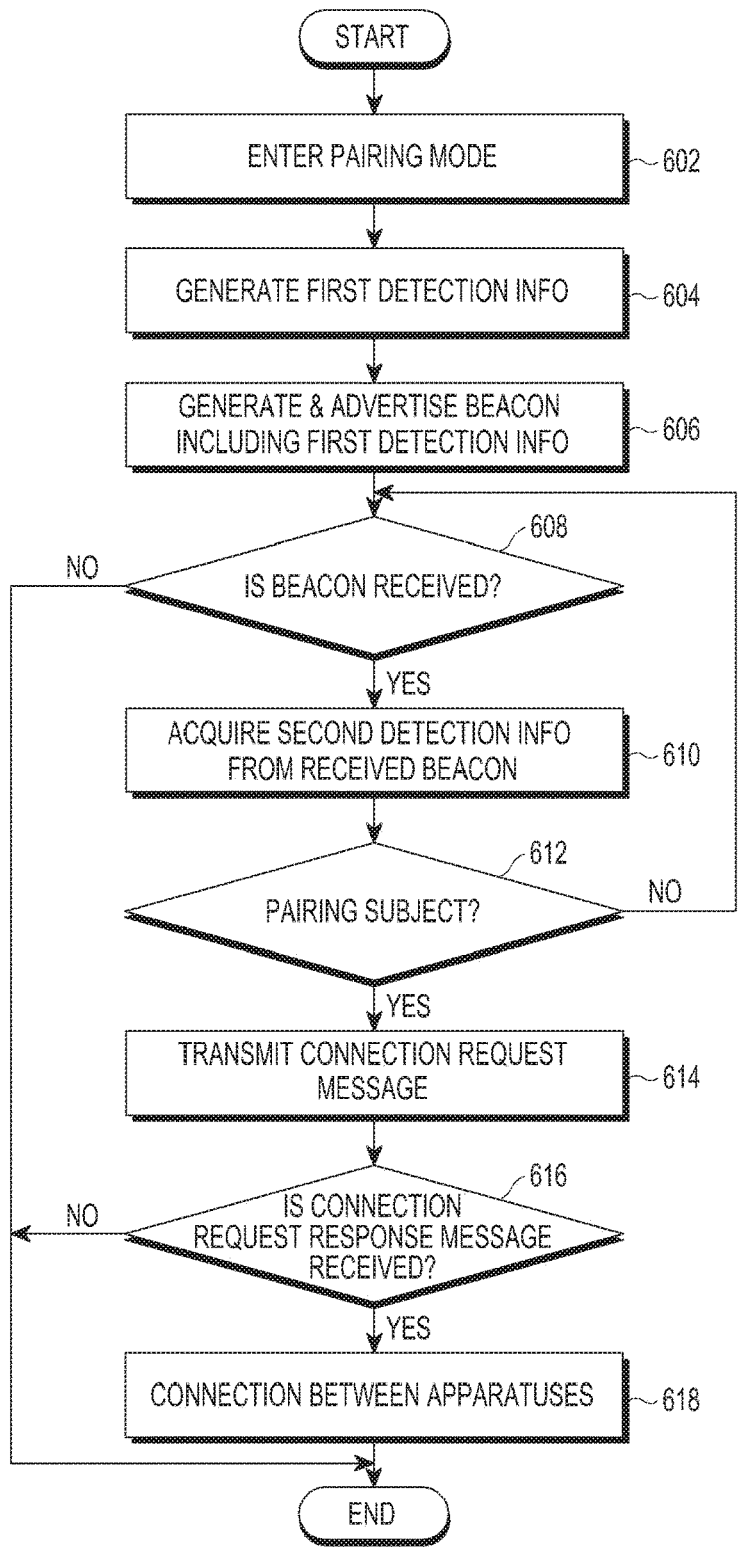
FIG. 6 is a flowchart illustrating a pairing operation of an electronic apparatus according to an embodiment of the present disclosure.

FIG. 6 is a flowchart illustrating a pairing operation of an electronic apparatus according to an embodiment of the present disclosure.

Referring to FIGS. 4 and 6, the pairing operation of the electronic apparatus 400 according to an embodiment of the present disclosure will be described.

In operation 602, the electronic apparatus 400 enters a pairing mode. In operation 604, the electronic apparatus 400 generates detection information (hereinafter referred to as "first detection information") based on a detection value detected by the sensor unit 420.

According to an embodiment of the present disclosure, the first detection information may include a first sensor code corresponding to the sensor type of the sensor unit 420, a first detection value detected by a sensor corresponding to the first sensor code, and first measurement time at a time point when the first detection value is detected. The first detection information may further include a first processed detection value partially extracted or processed based on at least one of the first detection value and the first measurement time.

In operation 606, the electronic apparatus 400 may generate at least one beacon packet including the first detection information and apparatus identification information (e.g., an apparatus ID) of the electronic apparatus 400, and may advertise the at least one beacon packet to at least one external electronic apparatus. According to an embodiment of the present disclosure, the generated beacon may be advertised to the at least one external electronic apparatus by using a wireless communication scheme.

According to an embodiment of the present disclosure, the electronic apparatus 400 may omit operation 606. According to an embodiment of the present disclosure, after the electronic apparatus 400 generates the beacon in operation 606, the electronic apparatus 400 may advertise the generated beacon in any operation after operation 606.

According to an embodiment of the present disclosure, the electronic apparatus 400 may perform operation 606 at a request from the at least one external electronic apparatus.

In operation 608, the electronic apparatus 400 determines whether a beacon including detection information (hereinafter referred to as "second detection information") is received from the at least one external electronic apparatus.

When the beacon including the second detection information has been received in operation 608, in operation 610, the electronic apparatus 400 may parse the received beacon, and may acquire the second detection information of the at least one external electronic apparatus, from at least one beacon packet included in the beacon.

According to an embodiment of the present disclosure, the second detection information may include a second sensor code corresponding to the sensor type of a sensor unit included in the at least one external electronic apparatus, a second detection value detected by a sensor corresponding to the second sensor code, and second measurement time at a time point when the second detection value is detected. The second detection information may further include a second processed detection value partially extracted or processed based on at least one of the second detection value and the second measurement time.

In operation 612, the electronic apparatus 400 may determine whether the at least one external electronic apparatus is at least one pairing subject, based on a result of comparing the first detection information with the second detection information.

When it is determined in operation 612 that the at least one external electronic apparatus is the at least one pairing subject, in operation 614, the electronic apparatus 400 may transmit a connection request message to the at least one pairing subject.

According to an embodiment of the present disclosure, the connection request message may include identification information (e.g., a name of a user, an ID, and the like) representing the user of the electronic apparatus 400.

Meanwhile, when it is determined in operation 612 that the at least one external electronic apparatus is not the at least one pairing subject, the electronic apparatus 400 may return to operation 608, may again determine whether a beacon including detection information (e.g., second detection information) is received from the at least one external electronic apparatus, and may repeatedly perform the subsequent operations, according to a result of the determination.

In operation 616, the electronic apparatus 400 may determine whether a connection request response message is received in response to the connection request message. When the connection request response message has been received in operation 616, in operation 618, the electronic apparatus 400 may control a connection with the at least one pairing subject.

According to an embodiment of the present disclosure, the connection request response message may include one of a connection acceptance message and a connection rejection message. When the received connection request response message includes the connection acceptance message, the electronic apparatus 400 may connect with the at least one pairing subject by using a wireless communication scheme. When the received connection request response message includes the connection rejection message, the electronic apparatus 400 may stop connecting with the at least one pairing subject.

Figure 7A:
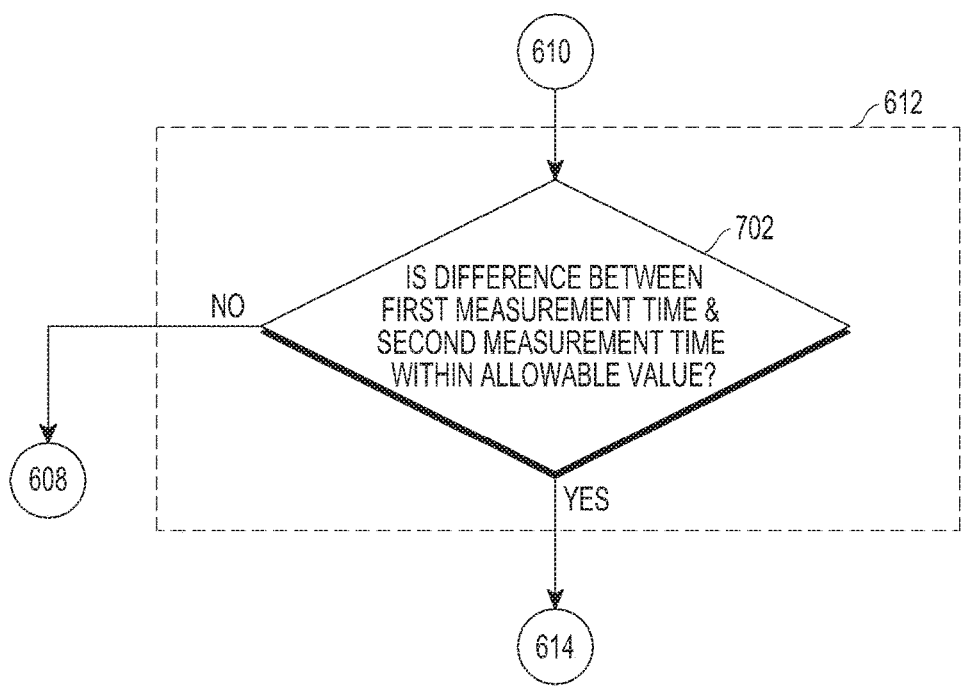
FIGS. 7A and 7B are flowcharts each illustrating an operation in which an electronic apparatus determines a pairing subject when identifying the pairing subject according to an embodiment of the present disclosure.
Figure 7B:
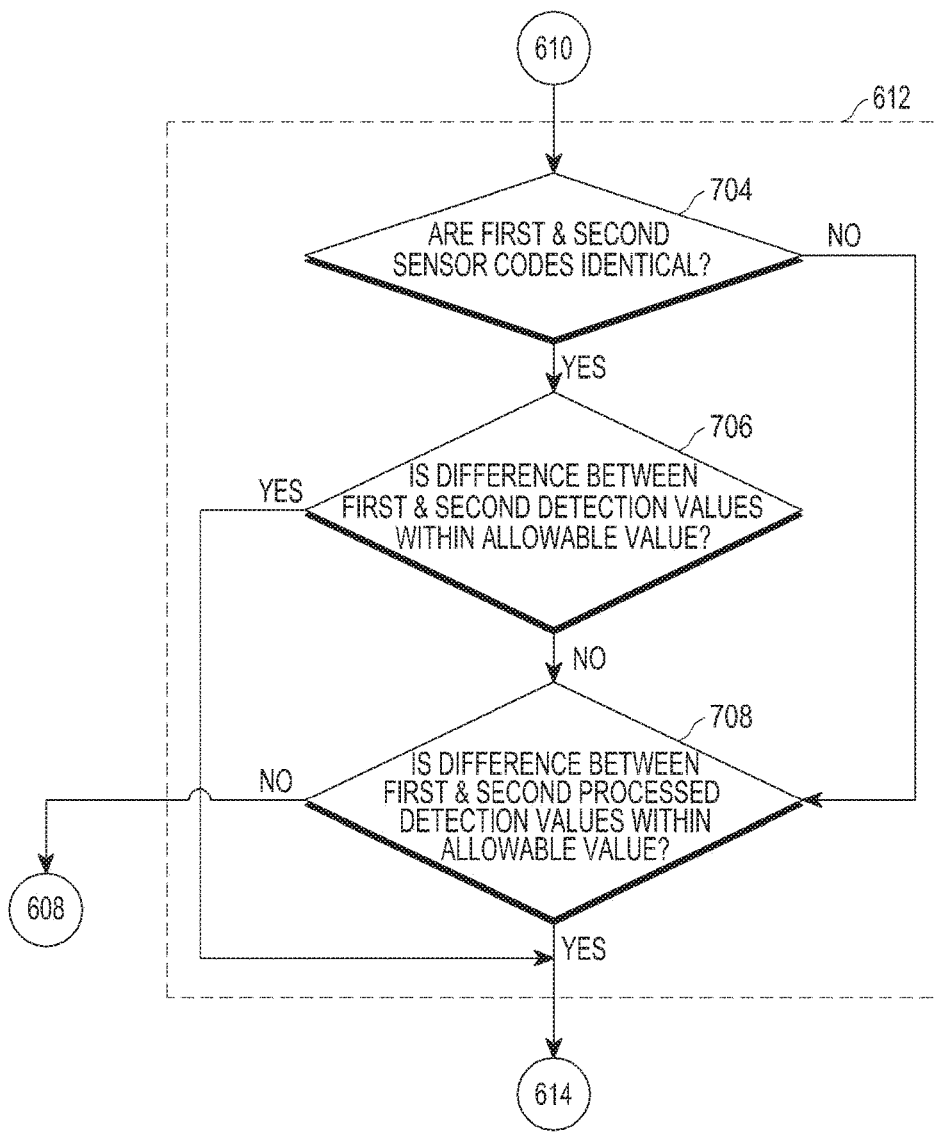

FIGS. 7A and 7B are flowcharts each illustrating an operation in which an electronic apparatus determines a pairing subject when identifying the pairing subject according to an embodiment of the present disclosure. FIGS. 7A and 7B illustrate operation 612 illustrated in FIG. 6 of determining whether the at least one external electronic apparatus is a pairing subject.

Referring to FIGS. 7A and 7B, the electronic apparatus 400 may determine whether the at least one external electronic apparatus is at least one pairing subject, by using the first detection information of the electronic apparatus 400 and the second detection information of the at least one external electronic apparatus, each of which corresponds to an action previously set for pairing.

According to an embodiment of the present disclosure, referring to FIG. 7A, in operation 702, the electronic apparatus 400 may calculate a difference between first measurement time included in the first detection information and second measurement time included in the second detection information, and may determine whether the calculated difference in measurement time is within a preset allowable value.

When the difference between the first measurement time and the second measurement time is within the preset allowable value in operation 702, the electronic apparatus 400 may determine that the at least one external electronic apparatus is the at least one pairing subject.

When the difference between the first measurement time and the second measurement time is greater than the preset allowable value in operation 702, the electronic apparatus 400 may determine that the at least one external electronic apparatus is not the at least one pairing subject, and may return to operation 608 illustrated in FIG. 6 and may again determine whether a beacon including detection information (e.g., second detection information) is received from the at least one external electronic apparatus.

According to an embodiment of the present disclosure, referring to FIG. 7B, in operation 704, the electronic apparatus 400 may determine whether a first sensor code included in the first detection information is identical to a second sensor code included in the second detection information. When the first sensor code included in the first detection information is identical to the second sensor code included in the second detection information, in operation 706, the electronic apparatus 400 may determine whether a difference between a first detection value included in the first detection information and a second detection value included in the second detection information is within a preset allowable value.

When the difference between the first detection value and the second detection value is within the preset allowable value in operation 706, the electronic apparatus 400 may determine that the at least one external electronic apparatus is the at least one pairing subject, and may return to operation 614 illustrated in FIG. 6 and may perform the subsequent operations.

When the difference between the first detection value and the second detection value is greater than the preset allowable value in operation 706, in operation 708, the electronic apparatus 400 may calculate a difference between a first processed detection value and a second processed detection value, and may determine whether the difference between the first processed detection value and the second processed detection value is within a preset allowable value.

When the difference between the first processed detection value and the second processed detection value is within the preset allowable value in operation 708, the electronic apparatus 400 may determine that the at least one external electronic apparatus is the at least one pairing subject, and may return to operation 614 illustrated in FIG. 6 and may perform the subsequent operations.

When the difference between the first processed detection value and the second processed detection value is greater than the preset allowable value in operation 708, the electronic apparatus 400 may determine that the at least one external electronic apparatus is not the at least one pairing subject, and may return to operation 608 illustrated in FIG. 6 and may again determine whether a beacon including detection information (e.g., second detection information) is received from the at least one external electronic apparatus.

In the present example, the first and second processed detection values may include at least one of values partially extracted from the first and second detection values, change patterns of the first and second detection values according to the first measurement time and the second measurement time, first measurement time and second measurement time respectively corresponding to inflection points of the first and second detection values, and information (e.g., coding information, into which the first and second detection values are converted) generated based on the first and second detection values.

According to an embodiment of the present disclosure, referring to FIG. 7B, in operation 704, the electronic apparatus 400 may determine whether the first sensor code included in the first detection information is identical to the second sensor code included in the second detection information. When the first sensor code is not identical to the second sensor code, the electronic apparatus 400 may omit operation 706, and may directly proceed to operation 708 and may determine whether the difference between the first processed detection value included in the first detection information and the second processed detection value included in the second detection information is within the preset allowable value.

When the difference between the first processed detection value and the second processed detection value is within the preset allowable value in operation 708, the electronic apparatus 400 may determine that the at least one external electronic apparatus is the at least one pairing subject, and may return to operation 614 illustrated in FIG. 6 and may perform the subsequent operations.

When the difference between the first processed detection value and the second processed detection value is greater than the preset allowable value in operation 708, the electronic apparatus 400 may determine that the at least one external electronic apparatus is not the at least one pairing subject, and may return to operation 608 illustrated in FIG. 6 and may determine whether a beacon including detection information (e.g., second detection information) is received from the at least one external electronic apparatus.

In the present example, the first and second processed detection values may include at least one of values partially extracted from the first and second detection values, change patterns of the first and second detection values according to the first measurement time and the second measurement time, first measurement time and second measurement time respectively corresponding to inflection points of the first and second detection values, and information (e.g., coding information, into which the first and second detection values are converted) generated based on the first and second detection values.

Figure 8:
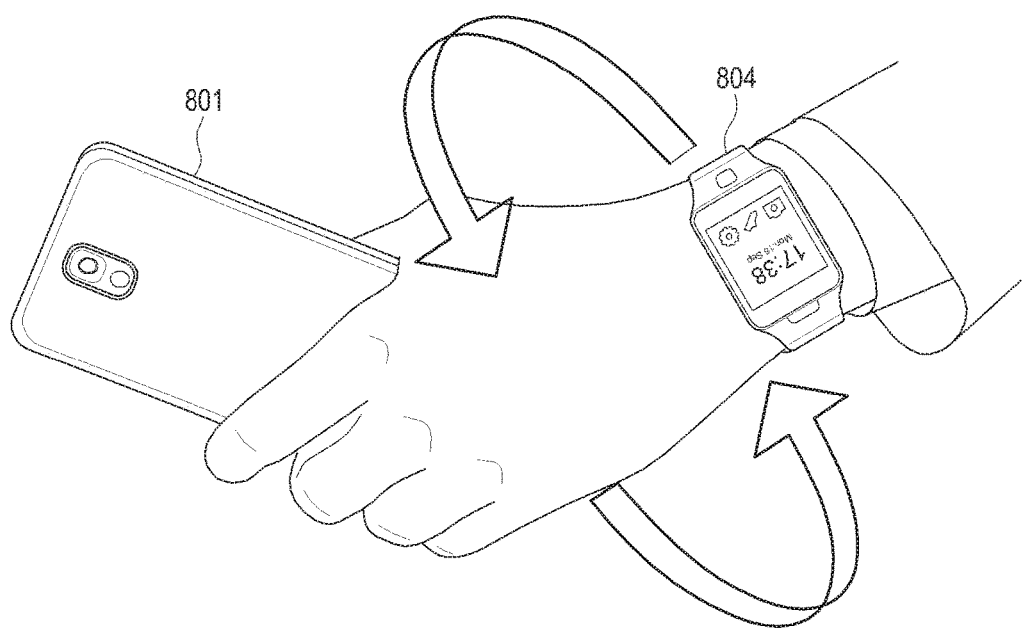
FIG. 8 illustrates an action previously set for pairing between multiple electronic apparatuses according to an embodiment of the present disclosure.

FIG. 8 illustrates an action previously set for pairing between multiple electronic apparatuses according to an embodiment of the present disclosure.

Referring to FIG. 8, an example of an action previously set for pairing is illustrated, with which the user allows two electronic apparatuses 801 and 804 to recognize that the two electronic apparatuses 801 and 804 are pairing counterparts by simultaneously shaking or rotating the two electronic apparatuses 801 and 804 when the user holds the one electronic apparatus 801 in one hand of the user and puts on the external electronic apparatus 804 on the wrist of the identical hand of the user. For example, the electronic apparatuses 801 may be a terminal, such as a smart phone, and the second electronic apparatus 804 may be a wearable apparatus, such as a smart watch.

According to an embodiment of the present disclosure, although not illustrated in the drawings, the user may allow two electronic apparatuses to recognize that the two electronic apparatuses are pairing counterparts, through an action such that the user simultaneously moves the two electronic apparatuses when the user holds the two electronic apparatuses in one hand or puts the external electronic apparatus on the one electronic apparatus.

Figure 9A:
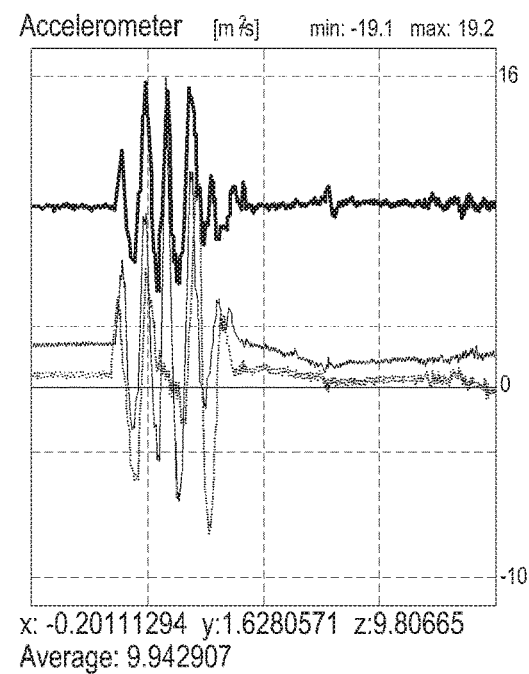
FIGS. 9A and 9B illustrate a detection value detected in response to an action previously set for pairing between multiple electronic apparatuses according to an embodiment of the present disclosure.
Figure 9B:
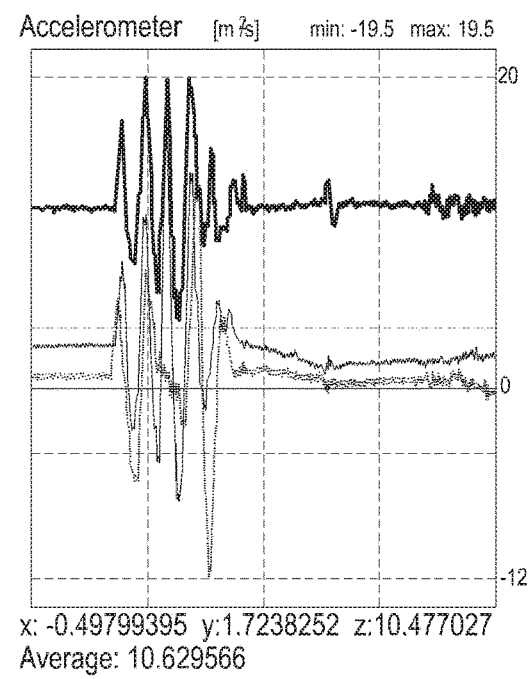

FIGS. 9A and 9B illustrate a detection value detected in response to an action previously set for pairing between multiple electronic apparatuses according to an embodiment of the present disclosure. Moreover, FIGS. 9A and 9B illustrate acceleration detection values each detected by an acceleration sensor in response to the action previously set for pairing as described above with reference to FIG. 8.

Referring to FIG. 9A, an acceleration detection value of the first electronic apparatus 801 illustrated in FIG. 8 is illustrated.

Referring to FIG. 9B, an acceleration detection value of the second electronic apparatus 804 illustrated in FIG. 8 is illustrated. When FIG. 9A is compared with FIG. 9B, it can be noted that the two acceleration detection values have similar acceleration values and similar acceleration patterns. In the graphs illustrated in FIGS. 9A and 9B, a dotted line graph represents an x-axis acceleration detection value, a thin solid-line graph represents a y-axis acceleration detection value, and a thick solid-line graph represents a z-axis acceleration detection value.

When the motion (i.e., the action previously set for pairing) occurs as described above with which the user simultaneously shakes or rotates the two electronic apparatuses 801 and 804, each of the two electronic apparatuses 801 and 804 may generate and advertise a beacon including detection information which is based on a detection value provided by a sensor of each of the two electronic apparatuses 801 and 804. Each of the two electronic apparatuses 801 and 804 may scan for the beacon among at least one of adjacent external electronic apparatuses, and may easily recognize at least one pairing subject among at least one of the adjacent external electronic apparatuses based on a result of comparison between processed detection values partially extracted or processed based on similar detection values or detection values during similar measurement time periods. Therefore, even in a situation where multiple external electronic apparatuses exist, it is possible to clearly and quickly recognize at least one external electronic apparatus, with which an electronic apparatus intends to pair, without searching for an apparatus ID of a pairing subject or performing a separate authentication procedure.

Figure 10:
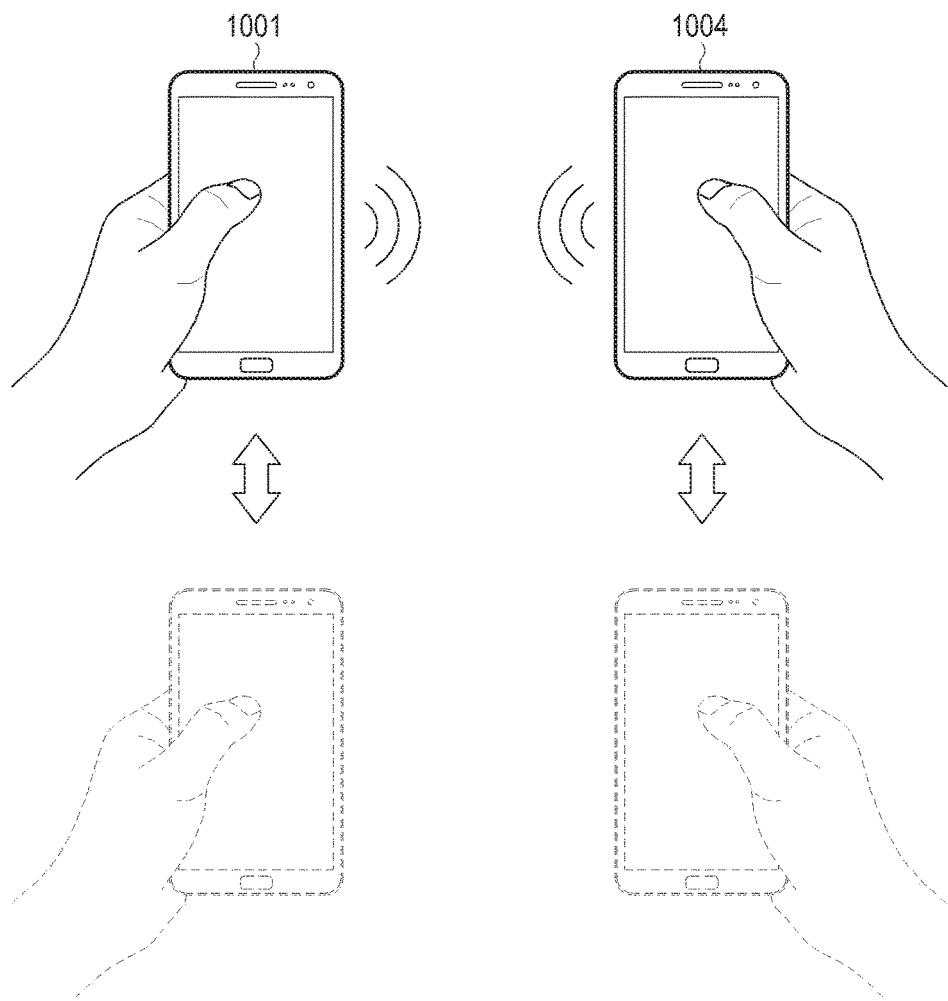
FIG. 10 illustrates an action previously set for pairing between multiple electronic apparatuses according to an embodiment of the present disclosure.

FIG. 10 illustrates an action previously set for pairing between multiple electronic apparatuses according to an embodiment of the present disclosure.

Referring to FIG. 10, an example of an action previously set for pairing is illustrated, with which the user allows two electronic apparatuses 1001 and 1004 to recognize that the two electronic apparatuses 1001 and 1004 are pairing counterparts by moving, simultaneously or closely in time, the two electronic apparatuses 1001 and 1004 in an identical direction and at an identical speed when the user holds the two electronic apparatuses 1001 and 1004 in both hands, respectively. For example, the two electronic apparatuses 1001 and 1004 may be terminals, such as smart phones.

When the motion (i.e., the action previously set for pairing) occurs as described above with which the user moves, simultaneously or closely in time, the two electronic apparatuses 1001 and 1004 in an identical direction and at an identical speed, each of the two electronic apparatuses 1001 and 1004 may generate and advertise a beacon including detection information which is based on a detection value provided by a sensor of each of the two electronic apparatuses 1001 and 1004. Each of the two electronic apparatuses 1001 and 1004 may scan for the beacon among at least one of adjacent external electronic apparatuses, and may easily recognize at least one pairing subject among at least one of the adjacent external electronic apparatuses based on a result of comparison between processed detection values partially extracted or processed based on similar detection values or detection values during similar measurement time periods. Therefore, even in a situation where multiple external electronic apparatuses exist, it is possible to clearly and quickly recognize at least one external electronic apparatus, with which an electronic apparatus intends to pair, without searching for an apparatus ID of a pairing subject or performing a separate authentication procedure.

Figure 11A:
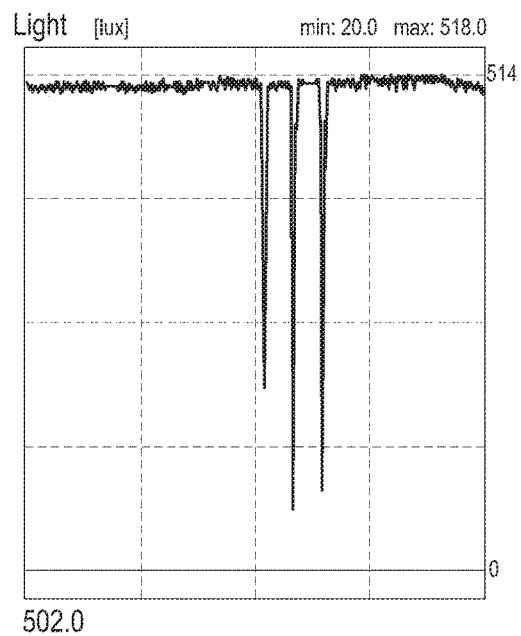
FIGS. 11A and 11B illustrate a detection value detected in response to an action previously set for pairing between multiple electronic apparatuses according to an embodiment of the present disclosure.
Figure 11B:
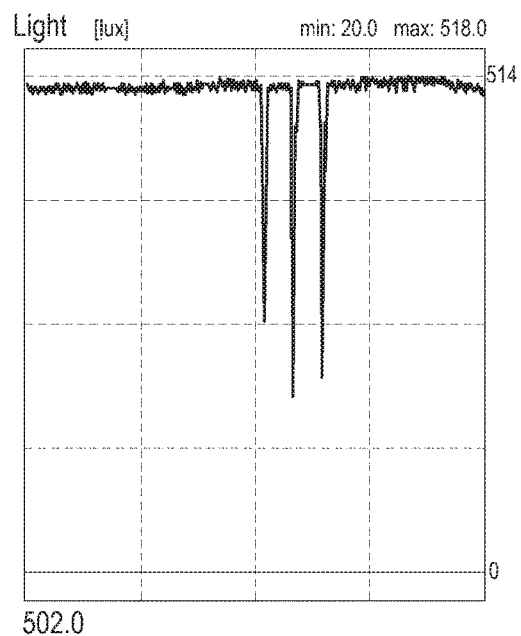

FIGS. 11A and 11B illustrate a detection value detected in response to an action previously set for pairing between multiple electronic apparatuses according to an embodiment of the present disclosure.

FIGS. 11A and 11B each illustrate an example of an action previously set for pairing, with which the user allows two electronic apparatuses to recognize that the two electronic apparatuses are pairing counterparts by putting the two electronic apparatuses in an identical environment and bringing the two electronic apparatuses into a change in illuminance. In the present example, the term "two electronic apparatuses" refer to the electronic apparatuses 801 and 804 illustrated in FIG. 8.

Referring to FIGS. 11A and 11B, FIG. 11A illustrates an illuminance detection value detected by a first electronic apparatus (e.g., the first electronic apparatus 801), such as a smart phone, and FIG. 11B illustrates an illuminance detection value detected by a second electronic apparatus (e.g., the second electronic apparatus 804), such as a smart watch.

When the illuminance detection value of FIG. 11A is compared with the illuminance detection value of FIG. 11B, it can be noted that magnitudes of illuminance detection values are not identical to each other according to a difference between apparatuses, such as a smart phone and a smart watch, but processed detection values, such as a change pattern of a detection value according to measurement time, are similar to each other. In order to more clearly compare change patterns of detection values, patterning is performed as illustrated in FIG. 12.

Figure 12:
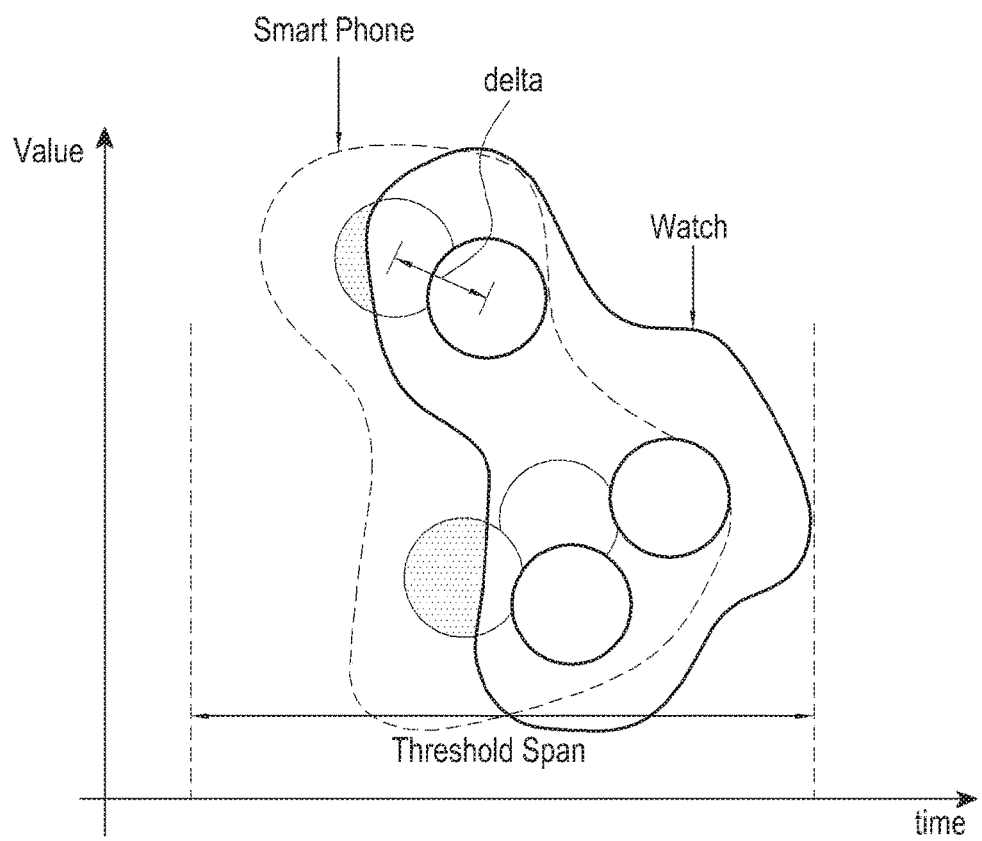
FIG. 12 illustrates a processed detection value corresponding to an action previously set for pairing between multiple electronic apparatuses according to an embodiment of the present disclosure.

FIG. 12 illustrates a processed detection value corresponding to an action previously set for pairing between multiple electronic apparatuses according to an embodiment of the present disclosure.

Referring to FIG. 12, processed detection values of a smart phone (e.g., the first electronic apparatus 801) are patterned with an illuminance detection value of the smart phone 801 as a center, which corresponds to measurement time when a inflection point (e.g., a maximum value/a minimum value greater than or equal to/less than or equal to a preset threshold) occurs according to the illuminance detection value of FIG. 11A. Processed detection values of a smart watch (e.g., the second electronic apparatus 804) are patterned with an illuminance detection value of the smart watch 804 as a center, which corresponds to measurement time when a inflection point occurs according to the illuminance detection value of FIG. 11B. As illustrated in FIG. 12, when a delta representing a difference between a change pattern of the illuminance detection value of the smart phone 801 and a change pattern of the illuminance detection value of the smart watch 804 is within a threshold span, each of the two electronic apparatuses 801 and 804 may determine that a counterpart thereof is a pairing subject. In contrast, when the delta is greater than the threshold span, each of the two electronic apparatuses 801 and 804 may determine that the counterpart thereof is not a pairing subject.

Meanwhile, in FIGS. 11A, 11B, and 12, the change patterns of the detection values of the sensors (e.g., illuminance sensors) of an identical type have been described. However, the present disclosure is not limited thereto, and thus may include various embodiments thereof.

For example, although not illustrated, an illuminance detection value is detected by a terminal (e.g., a smart phone) and a motion detection value (or an acceleration detection value) is detected by a smart watch, according to an action previously set for pairing, with which the user moves the user' hand, of which the user puts on the smart watch on the wrist, above the terminal so as to traverse the terminal. Accordingly, a pairing subject may be identified through comparison between measurement time points respectively corresponding to inflection points based on the inflection points of detection values occurring according to measurement time. Specifically, a difference between the measurement time points respectively corresponding to the inflection points is within an allowable value, each of the two electronic apparatuses may recognize that a counterpart thereof is a pairing subject. In contrast, when the difference between the measurement time points is greater than the allowable value, each of the two electronic apparatuses may recognize that the counterpart thereof is not a pairing subject.

As described above, even in the case of sensors of different types as well as sensors of an identical type, a pairing may be performed by using a processed detection value (e.g., a measurement time point corresponding to an inflection point based on the inflection point of a detection value).

According to various embodiments of the present disclosure, as described above, detection values according to a difference between sensors/apparatuses/functions may be identical to each other or may not have similar values between electronic apparatuses intended to be paired with each other. Accordingly, when a pairing is performed only through comparison between detection values, accuracy may be reduced.

Therefore, an electronic apparatus, according to an embodiment of the present disclosure, performs a pairing in view of a processed detection value (e.g., a change pattern of a detection value according to measurement time, or a measurement time point corresponding to an inflection point of a detection value) as well as through comparison between detection values, and thus can identify a pairing subject more easily, accurately, and quickly.

Figure 13A:
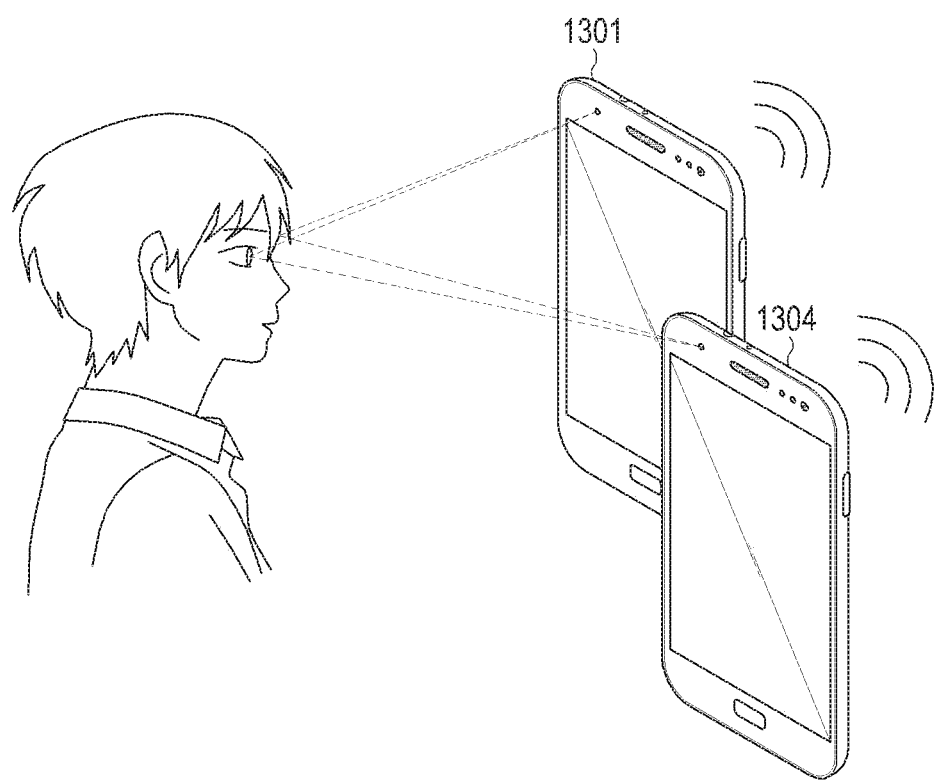
FIG. 13A illustrates an action previously set for pairing between multiple electronic apparatuses according to an embodiment of the present disclosure.
Figure 13B:
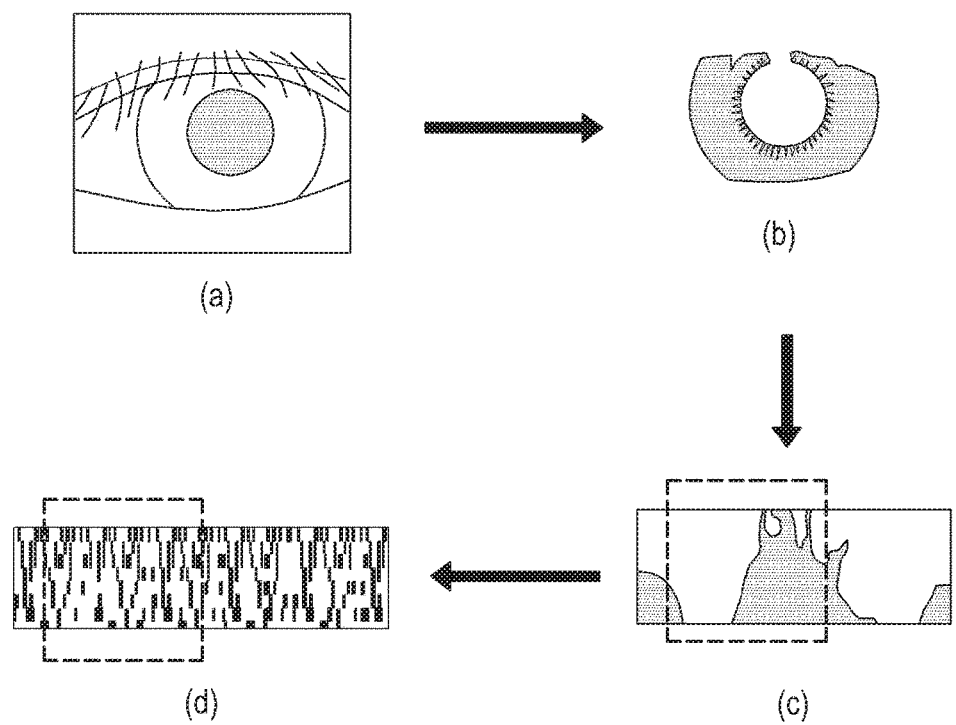
FIG. 13B illustrates generating a processed detection value which is processed based on a detection value detected through an action previously set for pairing between multiple electronic apparatuses according to an embodiment of the present disclosure.

FIG. 13A illustrates an action previously set for pairing between multiple electronic apparatuses according to an embodiment of the present disclosure. FIG. 13B illustrates generating a processed detection value which is processed based on a detection value detected through an action previously set for pairing between multiple electronic apparatuses according to an embodiment of the present disclosure.

Referring to FIG. 13A, it illustrates an example of an action previously set for pairing, with which the user allows a first electronic apparatus 1301 and a second electronic apparatus 1304 to recognize that the first and second electronic apparatuses 1301 and 1304 are pairing subjects by providing, simultaneously or closely in time, biometric recognition information (e.g., iris recognition information) of the identical user to biometric sensors included in the respective first and second electronic apparatuses 1301 and 1304. When a pairing is attempted by using the above-described method, convenience can be provided to the user through multiple pairings which enables not only a one-to-one connection but also a pairing with at least two apparatuses. Although the iris information provided by the iris sensor is used in FIG. 13A, embodiments of the present disclosure are not limited thereto. Accordingly, use may be made of unmentioned various pieces of biometric information, including a fingerprint.

Meanwhile, when a detection value detected by a sensor unit included in each electronic apparatus is an image (e.g., a panorama, a particular object, and a biometric information image, such as a fingerprint or an iris), the detection value may be processed as coding information converted from the whole or at least part of the image. A similarity may be calculated through comparison between the pieces of processed coding information. When the calculated similarity is within an allowable value, each electronic apparatus may recognize that a counterpart thereof is a pairing subject.

Referring to FIG. 13B, a description will be made of an operation for converting the above-described image into coding information when the above-described image is an iris image.

Referring to (a) of FIG. 13B, an iris image is detected by a biometric sensor, such as a camera or an infrared (IR) camera. The detected iris image is segmented through a certain pre-process, as illustrated in (b) of FIG. 13B. Referring to (c) of FIG. 13B, a polar transform is performed on the segmented iris image, a feature point is extracted based on polar coordinates in the polar-transformed iris image, and thereby certain coding information illustrated in (d) of FIG. 13B is generated.

According to an embodiment of the present disclosure, the detected iris image may be converted into coding information by using only a part of the biometric information as indicated by a dotted line box illustrated in (c) and (d) of FIG. 13B without using the whole of the biometric information, for security.

In FIGS. 8 to 13B, in order to facilitate a description of the present disclosure, an example of an action previously set for pairing between the two electronic apparatuses and a configuration in which a pairing subject is identified by using a detection value and a processed detection value according to the action are illustrated. However, embodiments of the present disclosure are not limited thereto. Embodiments of the present disclosure may also be applied to a pairing between two or more electronic apparatuses, and thereby multiple pairings may be performed.

According to an embodiment of the present disclosure, when three or more electronic apparatuses are paired with each other, one of the three or more electronic apparatuses may become a group owner, and the remaining electronic apparatuses may attempt to pair with the group owner.

Figure 14:
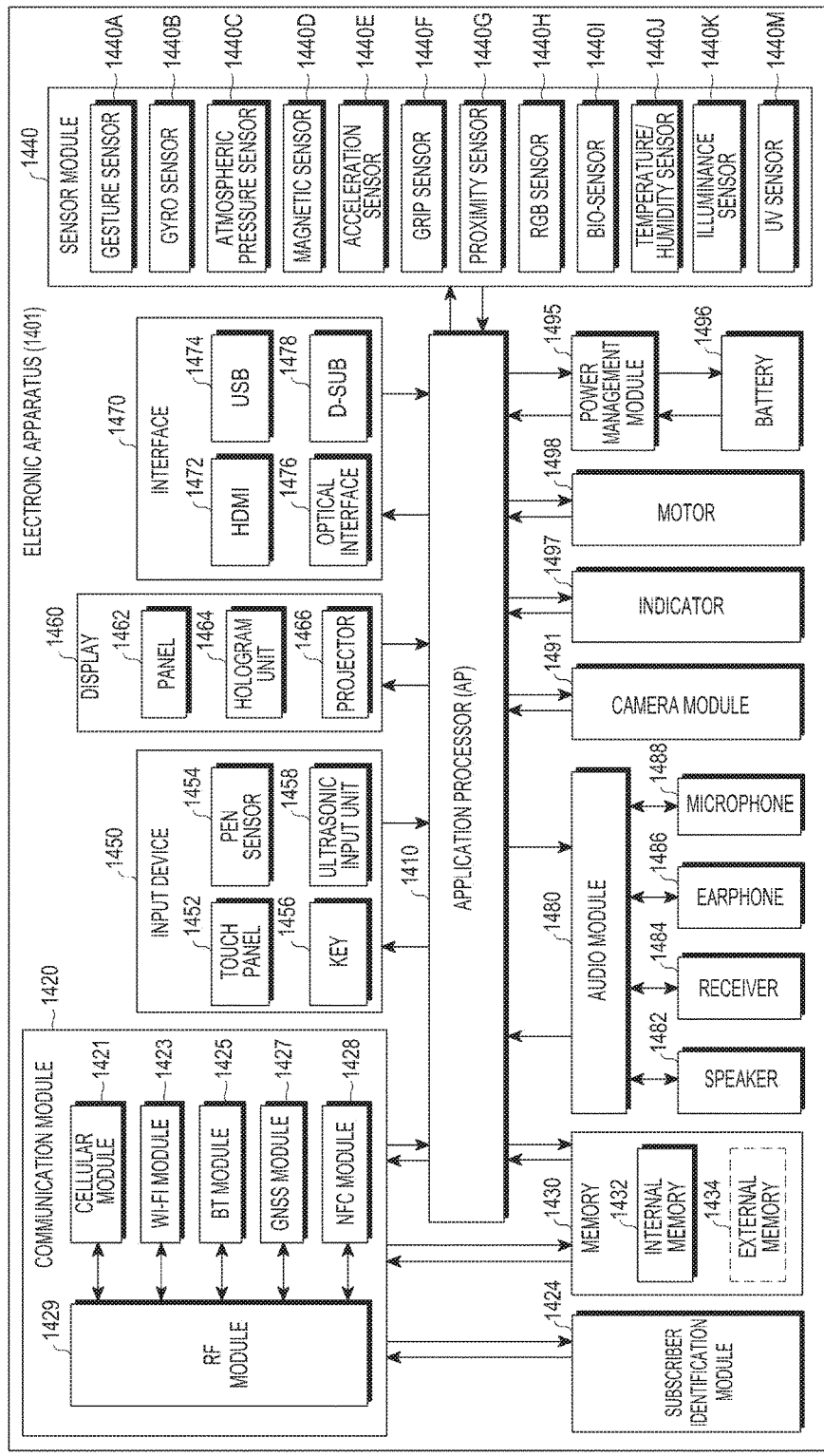
FIG. 14 is a block diagram illustrating a configuration of an electronic apparatus according to various embodiments of the present disclosure.

FIG. 14 is a block diagram illustrating a configuration of an electronic apparatus according to various embodiments of the present disclosure.

Referring to FIG. 14, an electronic apparatus 1401 may include the whole or part of the electronic apparatus 101 illustrated in FIG. 1. The electronic apparatus 1401 may include at least one processor (e.g., an AP) 1410, a communication module 1420, a subscriber identification module 1424, a memory 1430, a sensor module 1440, an input device 1450, a display 1460, an interface 1470, an audio module 1480, a camera module 1491, a power management module 1495, a battery 1496, an indicator 1497, and a motor 1498.

The processor 1410 may control multiple hardware or software elements connected to the processor 1410 by running, for example, an OS or an application program, and may perform processing of and arithmetic operations on various data. The processor 1410 may be implemented by, for example, a system on chip (SoC). According to an embodiment of the present disclosure, the AP 1410 may further include a graphical processing unit (GPU) and/or an image signal processor. The processor 1410 may include at least some (e.g., a cellular module 1421) of the elements illustrated in FIG. 14. The processor 1410 may load, into a volatile memory, instructions or data received from at least one (e.g., a non-volatile memory) of the other elements and may process the loaded instructions or data, and may store various data in a non-volatile memory.

The communication module 1420 may have a configuration identical or similar to that of the communication interface 170 illustrated in FIG. 1. The communication module 1420 may include, for example, the cellular module 1421, a Wi-Fi module 1423, a BT module 1425, a GNSS module 1427 (e.g., a GPS module, a GLONASS module, a BeiDou module, or a Galileo module), an NFC module 1428, and a radio Frequency (RF) module 1429.

For example, the cellular module 1421 may provide a voice call, an image call, a text message service, an Internet service, and the like through a communication network.

According to an embodiment of the present disclosure, the cellular module 1421 may identify or authenticate an electronic apparatus in the communication network by using the subscriber identification module (e.g., a subscriber identity module (SIM) card) 1424.

According to an embodiment of the present disclosure, the cellular module 1421 may perform at least some of the functions that the processor 1410 may provide.

According to an embodiment of the present disclosure, the cellular module 1421 may include a CP.

In addition, the cellular module 1421 may be implemented by, for example, an SoC.

Referring to FIG. 14, the elements, such as the cellular module 1421 (e.g., the communication processor), the memory 1430, the power management module 1495, and the like, are illustrated as being separate from the AP 1410. However, according to an embodiment of the present disclosure, the AP 1410 may be implemented to include at least some (e.g., the cellular module 1421) of the above-described elements.

Each of the Wi-Fi module 1423, the BT module 1425, the GNSS module 1427, and the NFC module 1428 may include, for example, a processor for processing data transmitted and received through the relevant module. According to some embodiments of the present disclosure, at least some (e.g., two or more) of the cellular module 1421, the Wi-Fi module 1423, the BT module 1425, the GNSS module 1427, and the NFC module 1428 may be included in one integrated chip (IC) or IC package.

The RF module 1429 may transmit and receive, for example, communication signals (e.g., RF signals). The RF module 1429 may include, for example, a transceiver, a power amplifier module (PAM), a frequency filter, a low noise amplifier (LNA), and an antenna. According to an embodiment of the present disclosure, at least one of the cellular module 1421, the Wi-Fi module 1423, the BT module 1425, the GNSS module 1427, and the NFC module 1428 may transmit and receive RF signals through a separate RF module.

The SIM 1424 may include, for example, a card including a SIM and/or an embedded SIM, and may contain unique identification information (e.g., an integrated circuit card ID (ICCID)) or subscriber information (e.g., an international mobile subscriber identity (IMSI)).

The memory 1430 (e.g., the memory 130) may include an internal memory 1432 and an external memory 1434. The memory 1430 may include at least one of, for example, a volatile memory (e.g., a dynamic random access memory (DRAM), a static RAM (SRAM), a synchronous DRAM (SDRAM), and the like), a non-volatile memory (e.g., a one time programmable read-only memory (OTPROM), a PROM, an erasable and programmable ROM (EPROM), an electrically erasable and programmable ROM (EEPROM), a mask ROM, a flash ROM, a flash memory (e.g., a Not AND (NAND) flash memory, a Not OR (NOR) flash memory, and the like), a hard drive, and a solid state drive (SSD).

The external memory 1434 may further include a flash drive, for example, a compact flash (CF), a secure digital (SD), a micro-SD, a mini-SD, an extreme digital (xD), a multi-media card (MMC), a memory stick, and the like. The external memory 1434 may be functionally and/or physically connected to the electronic apparatus 1401 through various interfaces.

For example, the sensor module 1440 may measure a physical quantity or may detect an operation state of the electronic apparatus 1401, and may convert the measured physical quantity or the detected operation state into an electrical signal. The sensor module 1440 may include at least one of, for example, a gesture sensor 1440A, a gyro sensor 1440B, an atmospheric pressure sensor 1440C, a magnetic sensor 1440D, an acceleration sensor 1440E, a grip sensor 1440F, a proximity sensor 1440G, a color sensor 1440H (e.g., a red-green-blue (RGB) sensor), a biometric sensor 1440I, a temperature/humidity sensor 1440J, an illuminance sensor 1440K, and an ultraviolet (UV) sensor 1440M. Additionally or alternatively, the sensor module 1440 may include, for example, an E-nose sensor, an electromyography (EMG) sensor, an electroencephalogram (EEG) sensor, an electrocardiogram (ECG) sensor, an IR (IR) sensor, an iris sensor, and/or a fingerprint sensor. The sensor module 1440 may further include a control circuit for controlling one or more sensors included therein. In some embodiments of the present disclosure, the electronic apparatus 1401 may further include a processor configured to control the sensor module 1440 as a part of or separately from the processor 1410, and may control the sensor module 1440 while the processor 1410 is in a sleep state.

The input device 1450 may include, for example, a touch panel 1452, a (digital) pen sensor 1454, a key 1456, and an ultrasonic input unit 1458. The touch panel 1452 may recognize a touch input in at least one of, for example, a capacitive scheme, a resistive scheme, an IR scheme, and an acoustic wave scheme. In addition, the touch panel 1452 may further include a control circuit. The touch panel 1452 may further include a tactile layer and may provide a tactile response to the user.

The (digital) pen sensor 1454 may include, for example, a recognition sheet which is a part of the touch panel or is separated from the touch panel. The key 1456 may be, for example, a physical button, an optical key, and a keypad. The ultrasonic input unit 1458 may detect an ultrasonic wave generated by an input unit through a microphone (e.g., the microphone 1488), and may confirm data corresponding to the detected ultrasonic wave.

The display 1460 (e.g., the display 160) may include a panel 1462, a hologram unit 1464, and a projector 1466. The panel 1462 may include a configuration identical or similar to that of the display 160 illustrated in FIG. 1. The panel 1462 may be implemented to be, for example, flexible, transparent, or wearable. The panel 1462 and the touch panel 1452 may be implemented as one module. The hologram unit 1464 may display a three-dimensional image in the air by using the interference of light. The projector 1466 may display an image by projecting light onto a screen. The screen may be located, for example, inside or outside the electronic apparatus 1401.

According to an embodiment of the present disclosure, the display 1460 may further include a control circuit for controlling the panel 1462, the hologram unit 1464, or the projector 1466.

The interface 1470 may include, for example, a HDMI 1472, a USB 1474, an optical interface 1476, and a d-sub-miniature (D-sub) 1478. The interface 1470 may be included in, for example, the communication interface 170 illustrated in FIG. 1. Additionally or alternatively, the interface 1470 may include, for example, a mobile high-definition link (MHL) interface, a SD card/MMC interface, or an IR data association (IrDA) standard interface.

For example, the audio module 1480 may bidirectionally convert between a sound and an electrical signal. At least some elements of the audio module 1480 may be included in, for example, the input/output interface 150 illustrated in FIG. 1. The audio module 1480 may process sound information which is input or output through, for example, a speaker 1482, a receiver 1484, an earphone 1486, the microphone 1488, and the like.

The camera module 1491 is, for example, a device capable of capturing a still image and a moving image.

According to an embodiment of the present disclosure, the camera module 1491 may include one or more image sensors (e.g., a front sensor or a back sensor), a lens, an image signal processor (ISP), and a flash (e.g., an LED, a xenon lamp, and the like).

The power management module 1495 may manage, for example, power of the electronic apparatus 1401.

According to an embodiment of the present disclosure, the power management module 1495 may include a power management IC (PMIC), a charger IC, a battery, or a fuel gauge. The PMIC may use a wired and/or wireless charging method. Examples of the wireless charging method may include, for example, a magnetic resonance method, a magnetic induction method, an electromagnetic method, and the like. Additional circuits (e.g., a coil loop, a resonance circuit, a rectifier, and the like) for wireless charging may be further included. The battery fuel gauge may measure, for example, a residual quantity of the battery 1496, and a voltage, a current, or a temperature during the charging. The battery 1496 may include, for example, a rechargeable battery and/or a solar battery.

The indicator 1497 may display a particular state (e.g., a booting state, a message state, a charging state, and the like) of the electronic apparatus 1401 or a part (e.g., the processor 1410) of the electronic apparatus 1401. The motor 1498 may convert an electrical signal into mechanical vibration, and may generate vibration, a haptic effect, and the like. Although not illustrated, the electronic apparatus 1401 may include a processing unit (e.g., a GPU) for supporting a mobile TV. The processing unit for supporting a mobile TV may process media data according to a standard, such as, for example, digital multimedia broadcasting (DMB), digital video broadcasting (DVB), or mediaFLO™.

Each of the above-described component elements of hardware according to the present disclosure may be configured with one or more components, and the names of the corresponding component elements may vary based on the type of electronic device. The electronic device according to various embodiments of the present disclosure may include at least one of the aforementioned elements. Some elements may be omitted or other additional elements may be further included in the electronic device. Further, some of the components of the electronic device according to the various embodiments of the present disclosure may be combined to form a single entity, and thus, may equivalently execute functions of the corresponding elements prior to the combination.

Figure 15:
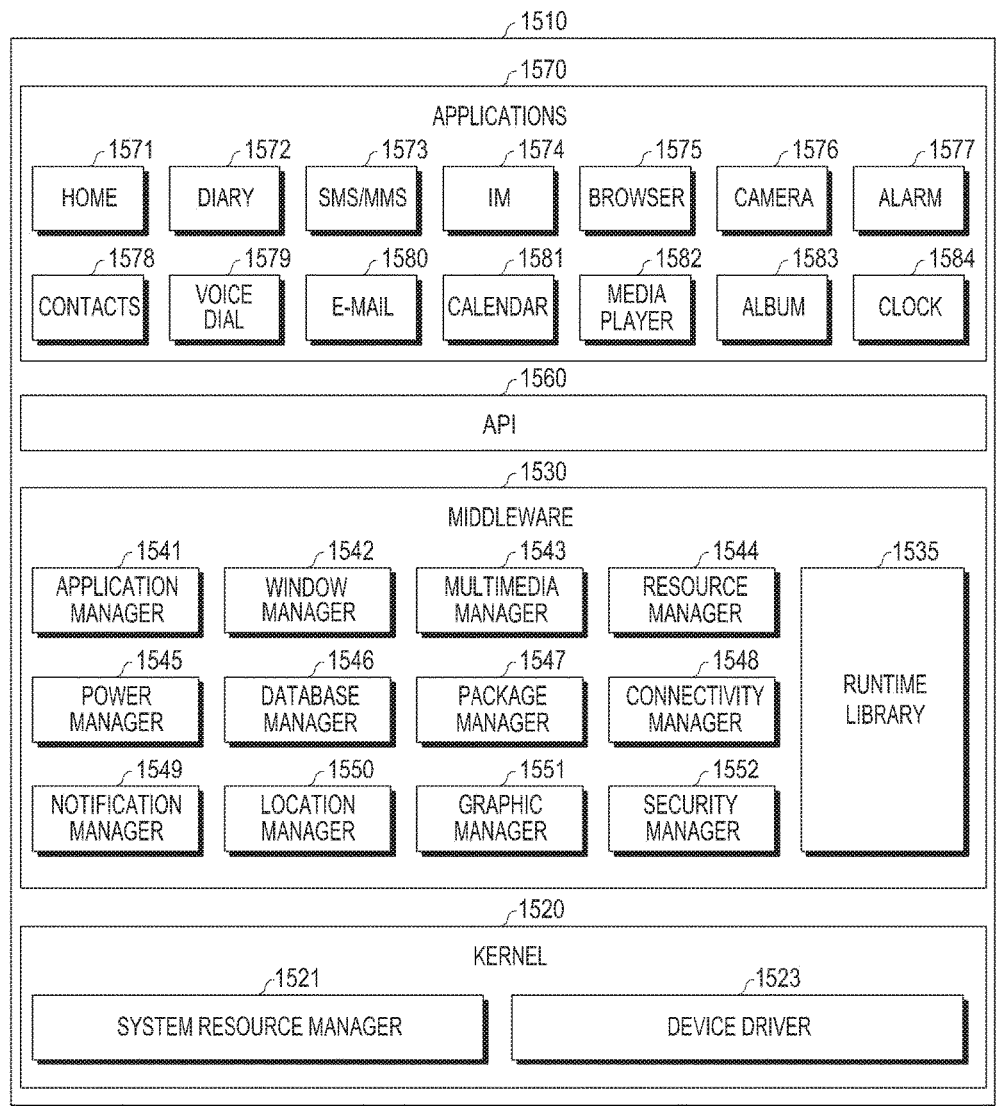
FIG. 15 is a block diagram illustrating a program module according to various embodiments of the present disclosure.

FIG. 15 is a block diagram illustrating a program module according to various embodiments of the present disclosure.

Referring to FIG. 15, according to an embodiment of the present disclosure, a program module 1510 (e.g., the program 140) may include an OS for controlling resources related to the electronic apparatus (e.g., the electronic apparatus 101) and/or various applications (e.g., the application programs 147) executed in the OS. The OS may be, for example, Android, iOS, Windows, Symbian, Tizen, Bada, and the like.

The program module 1510 may include a kernel 1520, middleware 1530, an API 1560, and/or an application 1570. At least some of the program module 1510 may be preloaded on the electronic apparatus, or may be downloaded from an external electronic apparatus (e.g., the first external electronic apparatus 103 or the second external electronic apparatus 104, or the server 106).

The kernel 1520 (e.g., the kernel 141) may include, for example, a system resource manager 1521 and/or a device driver 1523. The system resource manager 1521 may perform the control, allocation, retrieval, and the like of system resources.

According to an embodiment of the present disclosure, the system resource manager 1521 may include a process manager, a memory manager, a file system manager, and the like. The device driver 1523 may include, for example, a display driver, a camera driver, a BT driver, a shared memory driver, a USB driver, a keypad driver, a Wi-Fi driver, an audio driver, or an inter-process communication (IPC) driver.

For example, the middleware 1530 may provide a function required in common by the applications 1570, or may provide various functions to the applications 1570 through the API 1560 so as to enable the applications 1570 to efficiently use the limited system resources within the electronic apparatus.

According to an embodiment of the present disclosure, the middleware 1530 (e.g., the middleware 143) may include at least one of a runtime library 1535, an application manager 1541, a window manager 1542, a multimedia manager 1543, a resource manager 1544, a power manager 1545, a database manager 1546, a package manager 1547, a connectivity manager 1548, a notification manager 1549, a location manager 1550, a graphic manager 1551, and a security manager 1552.

The runtime library 1535 may include, for example, a library module that a complier uses to add a new function by using a programming language during the execution of the application 1570. The runtime library 1535 may perform input/output management, memory management, the functionality for an arithmetic function, and the like.

The application manager 1541 may manage, for example, the life cycle of at least one of the applications 1570. The window manager 1542 may manage graphical user interface (GUI) resources used for the screen. The multimedia manager 1543 may determine a format required to reproduce various media files, and may encode or decode a media file by using a coder/decoder (codec) appropriate for the relevant format. The resource manager 1544 may manage resources, such as a source code, a memory, a storage space, and the like of at least one of the applications 1570.

For example, the power manager 1545 may operate together with a basic input/output system (BIOS), and the like, and may manage a battery or power, and may provide power information and the like required for an operation of the electronic apparatus. The database manager 1546 may generate, search for, and/or change a database to be used by at least one of the applications 1570. The package manager 1547 may manage the installation or update of an application distributed in the form of a package file.

The connectivity manager 1548 may manage a wireless connection, such as, for example, Wi-Fi or BT. The notification manager 1549 may display or notify of an event, such as an arrival message, an appointment, a proximity notification, and the like, in such a manner as not to disturb the user. The location manager 1550 may manage location information of the electronic apparatus. The graphic manager 1551 may manage a graphic effect, which is to be provided to the user, or a user interface related to the graphic effect. The security manager 1552 may provide various security functions required for system security, user authentication, and the like.

According to an embodiment of the present disclosure, when the electronic apparatus (e.g., the electronic apparatus 101) has a telephone call function, the middleware 1530 may further include a telephony manager for managing a voice call function or a video call function of the electronic apparatus.

The middleware 1530 may include a middleware module that forms a combination of various functions of the above-described elements. The middleware 1530 may provide a module specialized for each type of OS in order to provide a differentiated function. In addition, the middleware 1530 may dynamically delete some of the existing elements, or may add new elements.

The API 1560 (e.g., the API 145) is, for example, a set of API programming functions, and may be provided with a different configuration according to an OS. For example, in the case of Android or iOS, one API set may be provided for each platform. In the case of Tizen, two or more API sets may be provided for each platform.

The applications 1570 (e.g., the application programs 147) may include one or more applications capable of performing functions, such as, for example, a home 1571, a dialer 1572, a short message service (SMS)/multimedia message service (MMS) 1573, an instant message (IM) 1574, a browser 1575, a camera 1576, an alarm 1577, a contact 1578, a voice dialer 1579, an email 1580, a calendar 1581, a media player 1582, an album 1583, a clock 1584, health care (e.g., which measures an exercise quantity, a blood sugar level, and the like), and providing of environmental information (e.g., information on atmospheric pressure, humidity, temperature, and the like).

According to an embodiment of the present disclosure, the applications 1570 may include an application (hereinafter, referred to as an "information exchange application" for convenience of description) supporting information exchange between the electronic apparatus (e.g., the electronic apparatus 101) and an external electronic apparatus (e.g., the first external electronic apparatus 103 or the second external electronic apparatus 104). Examples of the information exchange application may include a notification relay application for delivering particular information to an external electronic apparatus and a device management application for managing an external electronic apparatus.

For example, the notification relay application may include a function of delivering, to the external electronic apparatus (e.g., the first external electronic apparatus 103 or the second external electronic apparatus 104), notification information generated by other applications (e.g., an SMS/MMS application, an email application, a health care application, an environmental information application, and the like) of the electronic apparatus 101. In addition, for example, the notification relay application may receive notification information from the external electronic apparatus and may provide the received notification information to the user.

The device management application may manage (e.g., install, delete, or update), for example, at least one function (e.g., turning on/off the external electronic apparatus itself (or some component parts thereof) or adjusting the brightness (or resolution) of the display) of the external electronic apparatus (e.g., the first external electronic apparatus 103 or the second external electronic apparatus 104) communicating with the electronic apparatus, an application executed in the external electronic apparatus, or a service (e.g., a telephone call service, a message service, and the like) provided by the electronic apparatus.

According to an embodiment of the present disclosure, the application 1570 may include an application (e.g., a health care application of a mobile medical device, and the like) designated according to an attribute of the external electronic apparatus (e.g., the first external electronic apparatus 103 or the second external electronic apparatus 104). According to an embodiment of the present disclosure, the application 1570 may include an application received from the external electronic apparatus (e.g., the server 106, or the first external electronic apparatus 103 or the second external electronic apparatus 104).

According to an embodiment of the present disclosure, the application 1570 may include a preloaded application or a third party application which can be downloaded from the server. Names of the elements of the program module 1510, according to the above-described embodiments of the present disclosure, may change depending on the type of OS.

According to various embodiments of the present disclosure, at least some of the program module 1510 may be implemented in software, firmware, hardware, or a combination of two or more thereof. At least some of the program module 1510 may be implemented (e.g., executed) by, for example, the processor (e.g., the processor 1410). At least some of the program module 1510 may include, for example, a module, a program, a routine, a set of instructions, and/or a process for performing one or more functions.

The term "module" as used herein may, for example, mean a unit including one of hardware, software, and firmware or a combination of two or more of them. The "module" may be interchangeably used with, for example, the term "unit", "logic", "logical block", "component", or "circuit". The "module" may be a minimum unit of an integrated component element or a part thereof. The "module" may be a minimum unit for performing one or more functions or a part thereof. The "module" may be mechanically or electronically implemented. For example, the "module" according to the present disclosure may include at least one of an application-specific IC (ASIC) chip, a field-programmable gate arrays (FPGA), and a programmable-logic device for performing operations which has been known or are to be developed hereinafter.

According to various embodiments of the present disclosure, at least some of the devices (e.g., modules or functions thereof) or the method (e.g., operations) according to the present disclosure may be implemented by a command stored in a computer-readable storage medium in a programming module form. The instruction, when executed by a processor (e.g., the processor 120), may cause the one or more processors to execute the function corresponding to the instruction. The computer-readable storage medium may be, for example, the storage unit 130.

Certain aspects of the present disclosure can also be embodied as computer readable code on a non-transitory computer readable recording medium. A non-transitory computer readable recording medium is any data storage device that can store data which can be thereafter read by a computer system. Examples of the non-transitory computer readable recording medium include a Read-Only Memory (ROM), a Random-Access Memory (RAM), Compact Disc-ROMs (CD-ROMs), magnetic tapes, floppy disks, and optical data storage devices. The non-transitory computer readable recording medium can also be distributed over network coupled computer systems so that the computer readable code is stored and executed in a distributed fashion. In addition, functional programs, code, and code segments for accomplishing the present disclosure can be easily construed by programmers skilled in the art to which the present disclosure pertains.

At this point it should be noted that the various embodiments of the present disclosure as described above typically involve the processing of input data and the generation of output data to some extent. This input data processing and output data generation may be implemented in hardware or software in combination with hardware. For example, specific electronic components may be employed in a mobile device or similar or related circuitry for implementing the functions associated with the various embodiments of the present disclosure as described above. Alternatively, one or more processors operating in accordance with stored instructions may implement the functions associated with the various embodiments of the present disclosure as described above. If such is the case, it is within the scope of the present disclosure that such instructions may be stored on one or more non-transitory processor readable mediums. Examples of the processor readable mediums include a ROM, a RAM, CD-ROMs, magnetic tapes, floppy disks, and optical data storage devices. The processor readable mediums can also be distributed over network coupled computer systems so that the instructions are stored and executed in a distributed fashion. In addition, functional computer programs, instructions, and instruction segments for accomplishing the present disclosure can be easily construed by programmers skilled in the art to which the present disclosure pertains.

The programming module according to the present disclosure may include one or more of the aforementioned components or may further include other additional components, or some of the aforementioned components may be omitted. Operations executed by a module, a programming module, or other component elements according to various embodiments of the present disclosure may be executed sequentially, in parallel, repeatedly, or in a heuristic manner. Further, some operations may be executed according to another order or may be omitted, or other operations may be added.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method for identifying at least one pairing subject in an electronic apparatus, the method comprising:
   generating detection information of the electronic apparatus based on a predetermined action to be simultaneously performed for pairing in the electronic apparatus and at least one external electronic apparatus;
   receiving a beacon including detection information of the at least one external electronic apparatus based on the predetermined action from the at least one external electronic apparatus; and
   identifying the at least one pairing subject among the at least one external electronic apparatus based on a result of comparing the detection information included in the received beacon with the generated detection information.

2. The method of claim 1, further comprising acquiring the detection information of the at least one external electronic apparatus by parsing the received beacon.

3. The method of claim 1, wherein the detection information comprises at least one of a sensor code corresponding to a sensor type of each of sensors included in each of the electronic apparatuses, a detection value detected by each of the sensors according to the predetermined action, measurement time at a time point when the detection value is detected, or a processed detection value processed based on at least one of the detection value or the measurement time.

4. The method of claim 3, wherein the processed detection value comprises at least one of a value partially extracted from the detection value, a change pattern of the detection value according to the measurement time, a measurement time point corresponding to an inflection point of the detection value, or information generated based on the detection value.

5. The method of claim 3, wherein the identifying of the at least one pairing subject comprises determining the at least one external electronic apparatus as the at least one pairing subject when a difference between the measurement time included in the detection information of the electronic apparatus and the measurement time included in the detection information of the at least one external electronic apparatus is within a preset allowable value.

6. The method of claim 3, wherein the identifying of the at least one pairing subject comprises determining the at least one external electronic apparatus as the at least one pairing subject if a difference between the detection value included in the detection information of the electronic apparatus and the detection value included in the detection information of the at least one external electronic apparatus is within a preset allowable value, when the sensor code included in the detection information of the electronic apparatus is identical to the sensor code included in the detection information of the at least one external electronic apparatus.

7. The method of claim 6, wherein the identifying of the at least one pairing subject comprises determining the at least one external electronic apparatus as the at least one pairing subject if a difference between the processed detection value processed by the electronic apparatus and the processed detection value processed by the at least one external electronic apparatus is within a preset allowable value, when the difference between the detection value included in the detection information of the electronic apparatus and the detection value included in the detection information of the at least one external electronic apparatus is greater than the preset allowable value.

8. The method of claim 3, wherein the identifying of the at least one pairing subject comprises determining the at least one external electronic apparatus as the at least one pairing subject if a difference between the processed detection value processed by the electronic apparatus and the processed detection value processed by the at least one external electronic apparatus is within a preset allowable value, when the sensor code included in the detection information of the electronic apparatus is not identical to the sensor code included in the detection information of the at least one external electronic apparatus.

9. The method of claim 1, further comprising:
controlling a connection with the identified at least one pairing subject,
wherein the controlling of the connection with the identified at least one pairing subject comprises:
transmitting a connection request message to the at least one pairing subject,
receiving a connection request response message in response to the connection request message from the at least one pairing subject and
determining whether a connection with the at least one pairing subject is established according to the received connection request response message.

10. The method of claim 1, further comprising:
generating a beacon comprising the detection information and apparatus identification information of the electronic apparatus; and
advertising the generated beacon to the at least one external electronic apparatus.

11. At least one non-transitory computer readable storage medium for storing a computer program of instructions configured to be readable by at least one processor for instructing the at least one processor to execute a computer process for performing the method of claim 1.

12. An electronic apparatus comprising:
a communication interface; and
a processor configured to:
generate detection information of the electronic apparatus based on a predetermined action to be simultaneously performed for pairing in the electronic apparatus and at least one external electronic apparatus,
receive, from the at least one external electronic apparatus through the communication interface, a beacon including detection information of the at least one external electronic apparatus based on the predetermined action, and
identify at least one pairing subject among the at least one external electronic apparatus based on a result of comparing the detection information included in the received beacon with the generated detection information.

13. The electronic apparatus of claim 12, wherein the processor is further configured to acquire the detection information of the at least one external electronic apparatus by parsing the received beacon.

14. The electronic apparatus of claim 12, wherein the detection information comprises at least one of a sensor code corresponding to a sensor type of each of sensors included in each of the electronic apparatuses, a detection value detected by each of the sensors according to the predetermined action, measurement time at a time point when the detection value is detected, or a processed detection value processed based on at least one of the detection value or the measurement time.

15. The electronic apparatus of claim 14, wherein the processed detection value comprises at least one of a value partially extracted from the detection value, a change pattern of the detection value according to the measurement time, a measurement time point corresponding to an inflection point of the detection value, or information generated based on the detection value.

16. The electronic apparatus of claim 14, wherein the processor is further configured to determine the at least one external electronic apparatus as the at least one pairing subject when a difference between the measurement time included in the detection information of the electronic apparatus and the measurement time included in the detection information of the at least one external electronic apparatus is within a preset allowable value.

17. The electronic apparatus of claim 14, wherein the processor is further configured to determine the at least one external electronic apparatus as the at least one pairing subject if a difference between the detection value included in the detection information of the electronic apparatus and the detection value included in the detection information of the at least one external electronic apparatus is within a preset allowable value, when the sensor code included in the detection information of the electronic apparatus is identical to the sensor code included in the detection information of the at least one external electronic apparatus.

18. The electronic apparatus of claim 17, wherein the processor is further configured to determine the at least one external electronic apparatus as the at least one pairing subject if a difference between the processed detection value processed by the electronic apparatus and the processed detection value processed by the at least one external electronic apparatus is within a preset allowable value, when the difference between the detection value included in the detection information of the electronic apparatus and the detection value included in the detection information of the at least one external electronic apparatus is greater than the preset allowable value.

19. The electronic apparatus of claim 14, wherein the processor is further configured to determine the at least one external electronic apparatus as the at least one pairing subject if a difference between the processed detection value processed by the electronic apparatus and the processed detection value processed by the at least one external electronic apparatus is within a preset allowable value, when the sensor code included in the detection information of the electronic apparatus is not identical to the sensor code included in the detection information of the at least one external electronic apparatus.

20. The electronic apparatus of claim 12, wherein the processor is further configured to further control a connection with the identified at least one pairing subject.

* * * * *